United States Patent
Serizawa et al.

(10) Patent No.: US 9,325,368 B2
(45) Date of Patent: Apr. 26, 2016

(54) GATEWAY WIRELESS COMMUNICATION INSTRUMENT, WIRELESS COMMUNICATION SYSTEM, AND COMMUNICATION CONTROL METHOD

(71) Applicant: Hitachi, Ltd., Tokyo (JP)

(72) Inventors: Yasutaka Serizawa, Tokyo (JP);
Takashi Yano, Tokorozawa (JP);
Masayuki Miyazaki, Tokyo (JP);
Kenichi Mizugaki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/758,419

(22) Filed: Feb. 4, 2013

(65) Prior Publication Data

US 2013/0235905 A1 Sep. 12, 2013

(30) Foreign Application Priority Data

Mar. 8, 2012 (JP) .................. 2012-051907

(51) Int. Cl.
*H04B 1/00* (2006.01)
*H04B 1/713* (2011.01)
*H04B 7/26* (2006.01)

(52) U.S. Cl.
CPC .............. *H04B 1/713* (2013.01); *H04B 7/2656* (2013.01)

(58) Field of Classification Search
CPC ............... H04B 2001/7154; H04B 1/7143; H04B 1/40; H04B 3/23; H04B 3/32; H04L 25/0266; H04L 25/03343; H04L 7/033
See application file for complete search history.

(56) References Cited

U.S. PATENT DOCUMENTS

| | | | |
|---|---|---|---|
| 5,323,447 A * | 6/1994 | Gillis et al. | 455/464 |
| 6,718,159 B1 * | 4/2004 | Sato | 455/11.1 |
| 2003/0108008 A1 * | 6/2003 | Agrawal et al. | 370/332 |
| 2009/0164272 A1 * | 6/2009 | Bittlestone | 705/7 |
| 2010/0074384 A1 * | 3/2010 | Hirayama et al. | 375/371 |
| 2010/0329137 A1 | 12/2010 | Yamada et al. | |
| 2011/0026481 A1 * | 2/2011 | Takamatsu | 370/329 |
| 2011/0085457 A1 * | 4/2011 | Chen et al. | 370/252 |
| 2011/0261861 A1 * | 10/2011 | Lee et al. | 375/132 |

FOREIGN PATENT DOCUMENTS

JP 2009-171078 A 7/2009

* cited by examiner

*Primary Examiner* — Dac Ha
*Assistant Examiner* — Janice Tieu
(74) *Attorney, Agent, or Firm* — Foley & Lardner LLP

(57) ABSTRACT

A period is defined to execute the sequences (processes) of communication data acquisition, measuring communication quality, communication quality data acquisition, and channel change. Processing is controlled to execute each process within a time limit set for each process and execute all processes in one cycle. This avoids that a delayed sequence influences and delays other sequences and can suppress delays. If processing fails to finish a sequence, it will resume the same sequence in the next cycle. For communication stations sharing timeslots, there are provided offset periods differing in length before the start of carrier sense in the timeslots for these stations. Consequently, even under a condition in which packet collision may occur, the collision of packets can be avoided by detecting a packet sent to another station by carrier sense. Moreover, by controlling sending priority of packets in the send queue of the gateway, sending delay can be avoided.

8 Claims, 25 Drawing Sheets

| ADDRESS | FORWARDING ADDRESS |
|---------|--------------------|
| 100A    | 10A                |
| 100B    | 10A                |
| 100C    | 10B                |

FIG. 5

| HOPPING PATTERN TABLE | | | | | | | | | | | | | | |
|---|---|---|---|---|---|---|---|---|---|---|---|---|---|---|
| ch NO. | 11 | 15 | 19 | 23 | 25 | 16 | 18 | 12 | 21 | 14 | 13 | 17 | 20 | 22 | 24 |

↕ TIMESLOT 106, 206

| ch | INTERFERENCE OCCURRENCE RATE | ch | INTERFERENCE OCCURRENCE RATE |
|---|---|---|---|
| 11 | 5 | 19 | 0 |
| 12 | 5 | 20 | 40 |
| 13 | 10 | 21 | 0 |
| 14 | 20 | 22 | 10 |
| 15 | 15 | 23 | 5 |
| 16 | 10 | 24 | 0 |
| 17 | 10 | 25 | 0 |
| 18 | 0 | | |

FIG. 19

EX: THRESHOLD VALUE OF 20%

| ch | QUALITY | ch | QUALITY |
|----|---------|----|---------|
| 11 | ○ | 19 | ○ |
| 12 | ○ | 20 | × |
| 13 | ○ | 21 | ○ |
| 14 | × | 22 | ○ |
| 15 | ○ | 23 | ○ |
| 16 | ○ | 24 | ○ |
| 17 | ○ | 25 | ○ |
| 18 | ○ |    |   |

FIG. 21

EX: THRESHOLD VALUE OF 20%

| ch | INTERFERENCE OCCURRENCE RATE | QUALITY | ch | INTERFERENCE OCCURRENCE RATE | QUALITY |
|---|---|---|---|---|---|
| 11 | 40 | × | 19 | 0 | ○ |
| 12 | 30 | × | 20 | 10 | ○ |
| 13 | 10 | ○ | 21 | 20 | × |
| 14 | 20 | × | 22 | 30 | × |
| 15 | 40 | × | 23 | 25 | × |
| 16 | 35 | × | 24 | 10 | ○ |
| 17 | 25 | × | 25 | 0 | ○ |
| 18 | 0 | ○ | | | |

FIG. 22

| SUPERFRAME TABLE | | | | | | | | | | | | | | | | | | | | | | | |
|---|---|---|---|---|---|---|---|---|---|---|---|---|---|---|---|---|---|---|---|---|---|---|---|
| TIMESLOT NO. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| SEND/RECEIVE LINK | | | | SEND | | | | RECEIVE | | | | SEND | | | | RECEIVE | | | | SEND | | MEASUREMENT | MEASUREMENT |

1401
1402

| GROUP | ch NO. | | |
|---|---|---|---|
| A | 11 | 16 | 21 |
| B | 12 | 17 | 22 |
| C | 13 | 18 | 23 |
| D | 14 | 19 | 24 |
| E | 15 | 20 | 25 |

↑ WIRELESS LAN CHANNEL 1  
↑ WIRELESS LAN CHANNEL 6  
↑ WIRELESS LAN CHANNEL 11

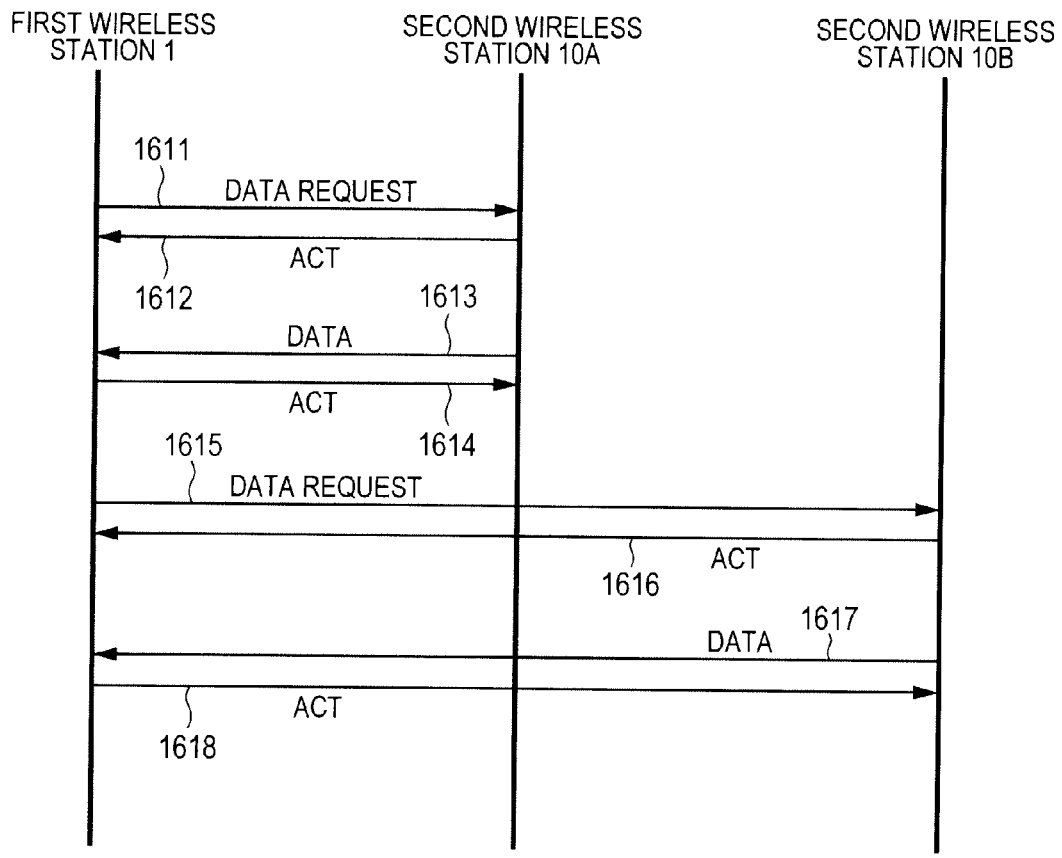
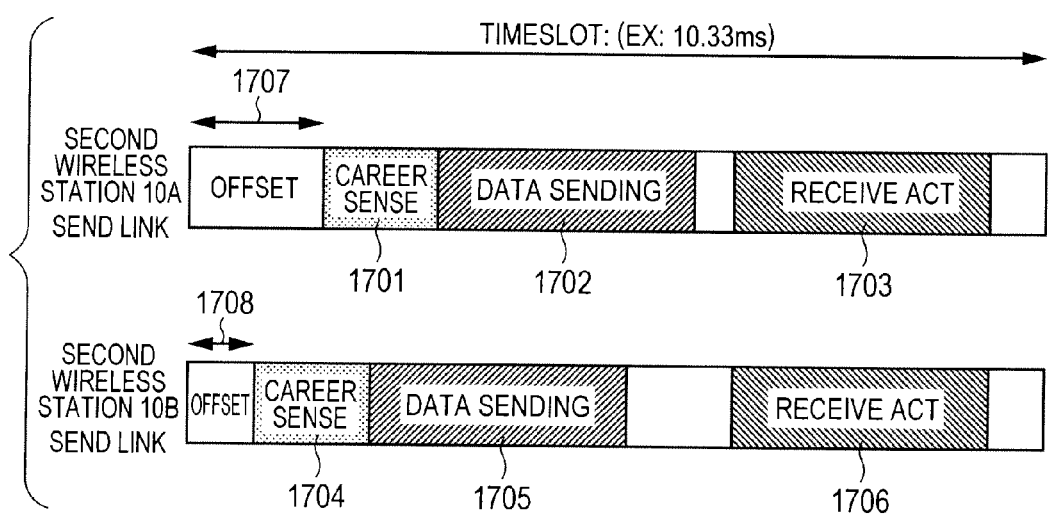

FIG. 29

EX: THE CASE OF EXECUTING DATA REQUEST FROM
FIRST WIRELESS STATION IN ORDER OF 10A → 10B

| SECOND WIRELESS STATION | PRIORITY OF PACKET SENDING IN SEND QUEUE(103) |
|---|---|
| 10A | 2 |
| 10B | 1 |

(PRIORITY: 1 > 2 > 3)

FIG. 30

| PACKET ADDRESS IN SEND QUEUE(103) | STORING ORDER IN SEND QUEUE(103) | SENDING ORDER |
|---|---|---|
| 10A | EARLIER | LATER |
| 10B | LATER | EARLIER |

GATEWAY WIRELESS COMMUNICATION INSTRUMENT, WIRELESS COMMUNICATION SYSTEM, AND COMMUNICATION CONTROL METHOD

CLAIM OF PRIORITY

The present application claims priority from Japanese patent application JP 2012-051907 filed on Mar. 8, 2012, the content of which is hereby incorporated by reference into this application.

FIELD OF THE INVENTION

The present invention relates to a gateway wireless communication instrument, a wireless communication system, and a communication control method.

BACKGROUND OF THE INVENTION

Demand of wireless communication is increasing in terms of easiness of equipment installation, low cost, and easiness of operation. Especially, in an industrial field, there are high expectations for wireless communication that solves a problem associated with the man-hours and cost of cable installation by conventional wired connections and with mobility and easiness to handle.

However, the present situation is such that high requirements specific to industrial applications impede wireless communication from coming into wide use in the industrial field. Therefore, it is required to solve problems proper to wireless communication and ensure reliability equivalent to or more than wired communication.

In this regard, for example, US Patent Application Publication No. 2010/0329137 discloses a method of executing communication, while adapting settings for communication for maintaining high reliability communication by tracking and responding to a change in an wireless communication environment, as a technique for enhancing reliability.

Besides, in ISA 100.11a standards, a method is disclosed that avoids radio interference from other wireless equipment within a system using Time Division Multiple Access (TDMA) and enables communication with a reduced radio interference occurrence rate by executing communication, while randomly changing communication frequencies by frequency hopping every time of sending.

SUMMARY OF THE INVENTION

In the above-mentioned wireless communication techniques of related art, when discontinued communication might occur affected by interference from other wireless systems or noise from equipment or the like, discontinued communication is avoided and reliability is ensured by a method of changing communication frequency settings by tracking and responding to a change in a communication environment.

However, in the above-mentioned wireless communication techniques of related art, communication frequency settings cannot be changed until sufficient statistical information about communication quality is accumulated by measuring communication quality. Not only a delay occurs in setup of frequency settings, but also a delay occurs in communication data transmission itself.

Besides, in wireless communication of related art, if a reception acknowledgement (ACK) is lost due to radio interference occurring and packets destined for a plurality of destinations remain in a send queue of one wireless station, sending of a packet destined for a destination is not finished until receiving ACK from the destination and the packet is removed from the send queue. This results in a problem in which transmission of communication data is delayed.

Moreover, in the wireless communication techniques of related art, discontinued communication due to packet contention would be avoided by checking (carrier sense) the radio use conditions of communication frequencies immediately before sending each packet. However, it is impossible to completely avoid packet contention within a system even if using a shared timeslot method in which a retransmission delay (retry delay) occurring at an unsuccessful communication is shortened in such a way that a plurality of wireless stations communicate in a same timeslot and on a same frequency as well as carrier sense.

The present invention has been made in view of the above-noted circumstances and provides a technique for preventing a delay in transmission of communication data.

In order to solve the above-noted problems, a gateway wireless communication instrument according to the present invention communicates with a plurality of wireless communication instruments by executing time division multiple access and channel hopping. The gateway wireless communication instrument regards a period between successive timings of data acquisition as one cycle and, in each cycle, executes (i) a process of communication data acquisition for acquiring communication data from the wireless communication instruments, (ii) a process of measuring communication quality for measuring communication quality on the wireless communication instruments, (iii) a process of communication quality data acquisition for acquiring respective communication quality data measured at the wireless communication instruments, and (iv) a process of channel change that changes hopping frequencies based on the communication quality data acquired by the process of communication quality data acquisition. The process of communication data acquisition, the process of measuring communication quality, the process of communication quality data acquisition, and the process of channel change are executed in one cycle, while being changed from one process to another in order, based on a time limit set for each process.

Further features related to the present invention will be apparent from the description of the present specification and the accompanying drawings. Aspects of the present invention are achieved and realized by elements and various combinations of elements, the following detailed description, and the aspects of the attached claims.

It needs to be understood that the description of the present specification is only typical and illustrative and is not intended to limit the claims or application examples of the present invention in any sense.

According to the present invention, it becomes possible to effectively prevent a delay that may occur when communication data is transmitted.

BRIEF DESCRIPTION OF THE DRAWINGS

FIG. 5 is a diagram showing an example of a hopping pattern table.

FIG. 19 is a diagram showing an example of a per-channel communication quality table which is generated by the first wireless station 1.

FIG. 21 is a diagram showing an example of a per-channel communication quality table, when most channels suffer from bad communication quality.

FIG. 22 is a diagram showing an example of a superframe structure according to a third embodiment.

FIG. 27 is a diagram for explaining a message sending and receiving sequence according to fifth and sixth embodiments.

FIG. 28 is a diagram showing examples of timeslot structures for a second wireless station 10A and a second wireless station 10B which share a superframe table.

FIG. 29 is a diagram showing an example of setting in a send queue 103 according to a sixth embodiment.

FIG. 30 is a diagram showing an example of a packet management table held by the send queue.

DETAILED DESCRIPTION OF THE PREFERRED EMBODIMENTS

Figure 1:
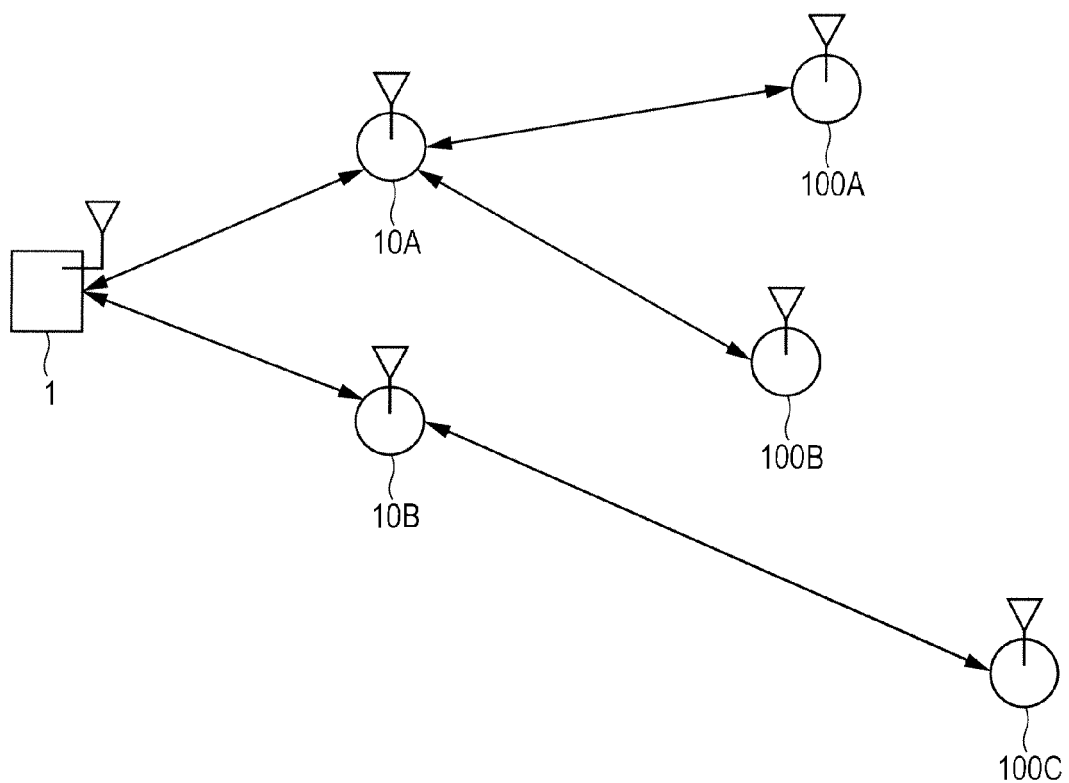
FIG. 1 is a diagram showing an example of a schematic structure of a wireless communication system of the present invention.

In the following, embodiments of the present invention will be described with reference to the accompanying drawings.

In the accompanying drawings, functionally identical elements may be marked with same reference numerals. The accompanying drawings show specific embodiments and examples according to the principle of the present invention. These drawings are intended for understanding of the present invention and they are by no means used to interpret the present invention restrictively.

Embodiments disclosed herein are described in detail enough for those skilled in the art to carry out the present invention. However, other implementations and embodiments are also possible. It needs to be understood that a structure or configuration described herein may be modified and diverse elements may be rearranged without departing from the scope and spirit of the technical idea of the invention. Therefore, the following descriptions should not be construed as limiting thereto.

Moreover, the embodiments of the present invention may be implemented by software running on a general-purpose computer or may be implemented by dedicated hardware or combination of software and hardware, as will be described later.

Although description is made about information particulars involved in the present invention in a "table" form in the following description, these information particulars may not necessarily be expressed in a table data structure, but may be expressed in a data structure such as a list, DB, and queue and others. Therefore, to imply that the information particulars do not depend on data structure, "table", "list", "DB", "queue", etc. may also be referred to as "information" simply.

In the following, each process in an embodiment of the present invention may be described on the assumption that "a control part (which may also be referred to as a processor)" is the subject (that performs an operation). However, descriptions may also be provided, taking each process (program) as the subject, since the processor executes a predefined process (a program corresponding to a flowchart), while using a memory or a communication port (communication control device).

(1) First Embodiment

Outline of a Multi-Hop Wireless Communication System

FIG. 1 is a diagram showing an outline of a multi-hop wireless communication system in an ad-hoc network according to an embodiment of the present invention.

The multi-hop wireless communication system includes a first wireless station 1 that sends a data request command, third wireless stations 100A to 100C that send data in response to a data request command, and second wireless stations 10A and 10B that relay a data request command and data to the third wireless stations 100A to 100C and the first wireless station 1 and send data they have to the first wireless station 1.

Although the numbers of the second and third wireless stations are two and three, respectively, as shown here, for simplicity of description, there is no limitation to the number of instruments constituting the system. Also, there is no limitation to the number of multi-hops. In the embodiment of the present invention, in order to avoid duplicated description, an example is presented in which a second wireless station 10 functions as a relay to relay a data request command destined for a third wireless station 100 but, when receiving a data request destined for the second wireless station 10, it functions as a terminal that sends sensor data.

<Schematic Structure of the First Wireless Station>

Figure 2:
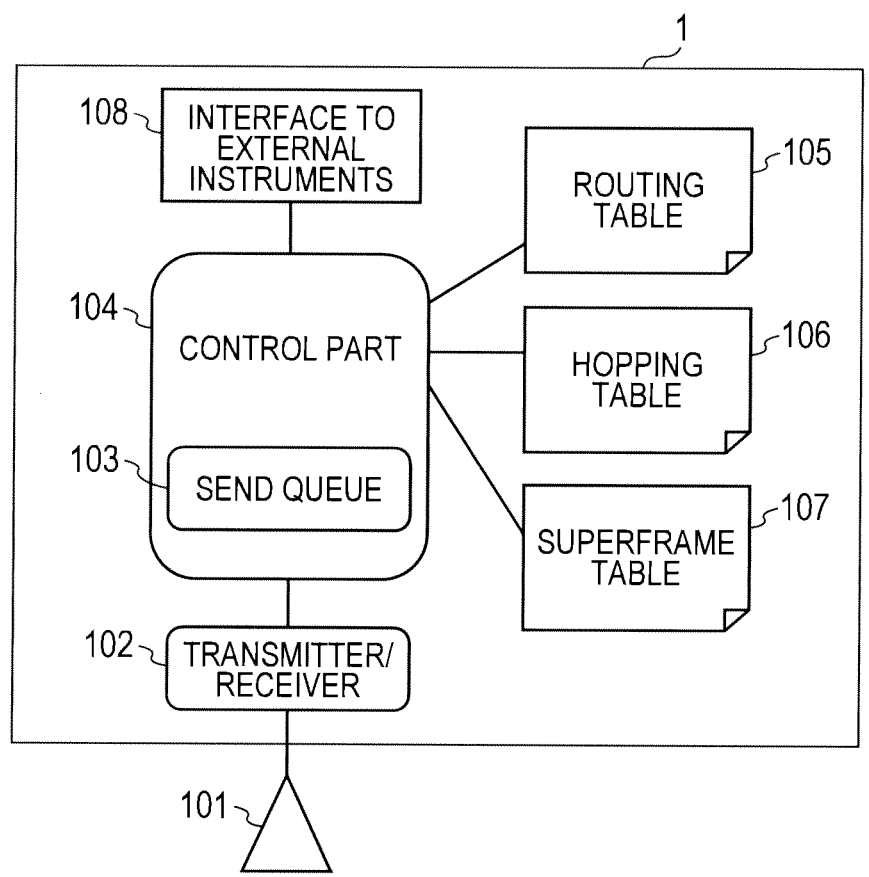
FIG. 2 is a diagram showing an example of a schematic structure of a first wireless station 1.

FIG. 2 is a diagram showing an example of a schematic structure of the first wireless station (which may also be referred to as a first wireless instrument, a base station or a gateway instrument) 1. The first wireless station 1 includes an antenna 101, a transmitter/receiver 102, a control part (processor) 104 which includes a send queue 103, a routing table 105, a hopping table 106, a superframe table 107, and an interface (IF) to external instruments 108.

Figure 6:
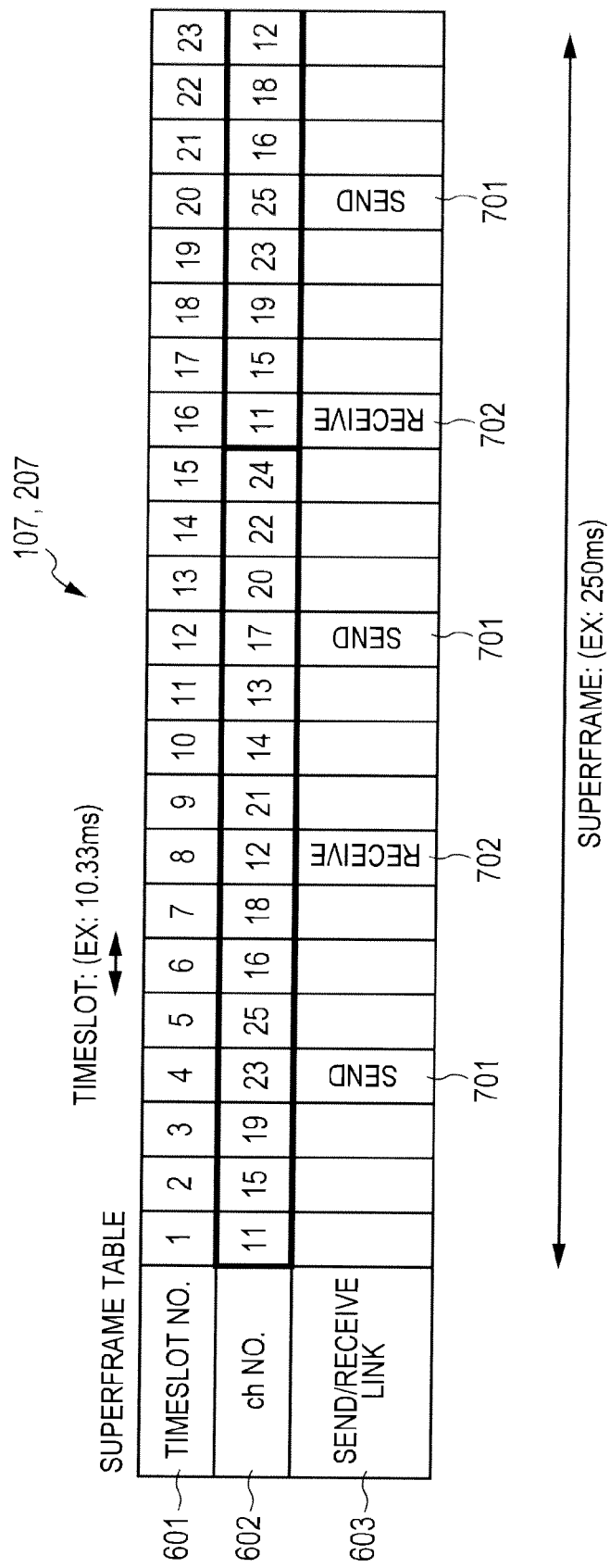
FIG. 6 is a diagram showing an example of a superframe table.

The control part (processor) 104 conducts communication quality management and packet sending/receiving management and, at packet generation timing, generates data request packets destined for second and third wireless stations 10 and 100. The control part stores generated packets into the send queue 103. Then, according to timing described in the superframe table 107, the control part 104 sends a packet by radio to an address described in the routing table 105 via the transmitter/receiver 102 and antenna 101, using a frequency described in the hopping table 106. Here, a superframe is information representing a communication cycle unit composed of a plurality of timeslots, which is as shown in FIG. 6. The routing table 105, hopping table 106, and superframe table 107, which will be described later, can be rewritten by the control part 104.

Moreover, the control part 104 can send received data to an external instrument such as PC and parameters of itself (control part 104) can be rewritten from an external instrument via the IF to external instruments 108.

<Schematic Structure of Second and Third Wireless Stations>

Figures 3, 4:
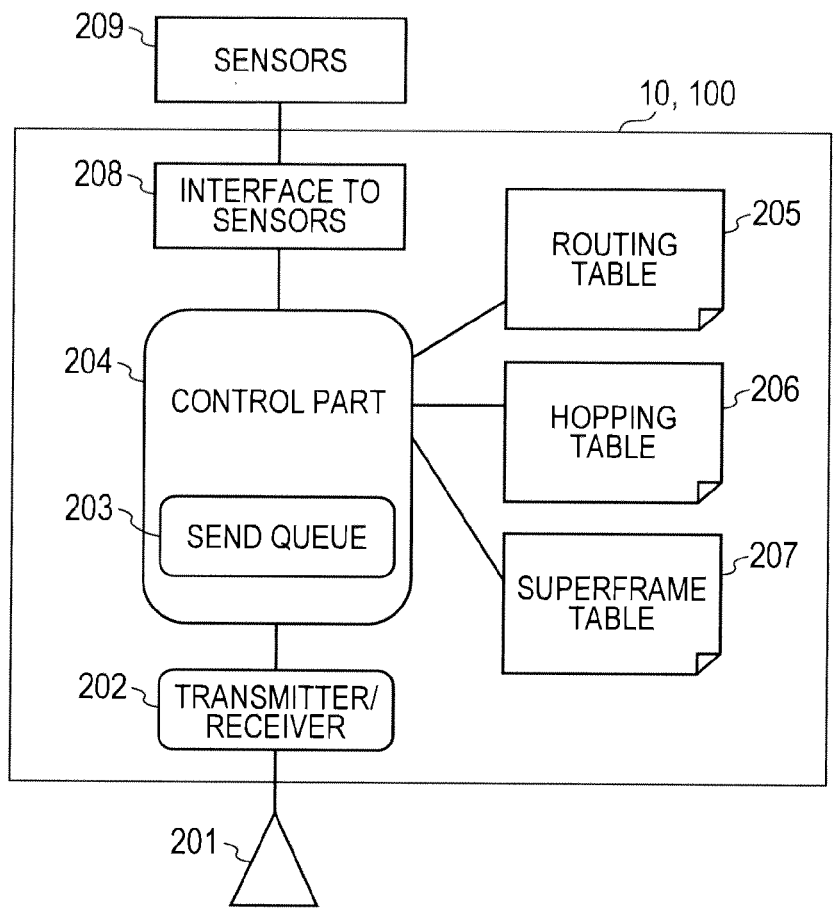
FIG. 3 is a diagram showing an example of a schematic structure of each of second and third wireless stations.
FIG. 4 is a diagram showing an example of a routing table of the first base station 1.

FIG. 3 is a diagram showing an example of a schematic structure of each of the second and third wireless stations 10A, 10B, and 100A to 100C. Each of the second and third wireless stations 10A, 10B, and 100A to 100C includes an antenna 210, a transmitter/receiver 202, a control part (processor) 204 which includes a send queue 203, a routing table 205, a hopping table 206, a superframe table 207, and an interface (IF) to sensors 208, and sensors 209.

Sensor data acquired by the sensors (such as an image sensor (CCD or the like), temperature sensor, humidity sensor, angular velocity sensor, and acceleration sensor) 209 is input to the send queue 203 within the control part 204 via the IF to sensors 208.

Upon receiving a data request command from one of the second wireless stations 10A, 10B (in the case of the control part of one of the third wireless stations 100A to 100C), the control part 204 refers to the routing table 205, hopping table 206, and superframe table 207, which will be described later, and sends a packet in the send queue 203 to the requesting wireless station via the transmitter/receiver 202 and antenna 201. In addition, the control part 20 is arranged to be able to rewrite the routing table 205, hopping table 206, and superframe table 207 in response to a change command which the antenna 201 and transmitter/receiver 202 receive from the first wireless station 1.

<Structure of a Routing Table>

FIG. 4 is a diagram showing an example of a structure of the routing table 105 maintained in the first wireless station 1. The routing table 105 holds information for a destination address 401 and a forwarding address 402 of a packet. The destination address 401 of a packet indicates information of the final destination (wireless station) to which the intended packet is to be transmitted. The forwarding address 402 indicates information on the destination (wireless station) to which the intended packet is to be transmitted directly. A packet transmitted to the forwarding address 402 is transmitted via it to the final destination address 401.

A wireless station that holds this table determines which station to forward a packet to next from the destination address and sends the packet to that station, so that the packet can be transmitted through a correct route to the destination address.

Routing tables 205 maintained in second wireless stations and third wireless stations are also comprised of information on destination and forwarding addresses like the routing table of FIG. 4.

<Structure of a Hopping Pattern Table>

FIG. 5 is a diagram showing an example of a structure of a hopping pattern table 106, 206. The hopping pattern table 106, 206 holds information on channel numbers that are used for each timeslot and the information on channel numbers (hopping frequencies) can be rewritten, as appropriate, by the first wireless station 1, as will be described later.

Each wireless station refers to the hopping pattern table configured between it and a station to which it sends packets or from which it receives packets and sends/receives, while changing a channel per timeslot. When a timeslot assigned for sending/receiving comes, it sends/receives on a channel predefined for the timeslot.

An example in FIG. 5 is illustrated on the assumption of using channels 11-25 in a 2.4 GHz band, defined in IEEE 802.15.4 standards. However, the table may hold indicators that can correspond to communication frequencies, not the channel numbers.

<Structure of a Superframe Table>

FIG. 6 is a diagram showing an example of a structure of a superframe table 107, 207. The superframe table 107, 207 contains timeslot number 601, channel number 602, send/receive link 603 information as its components and represents cyclic units of send/receive links. Although, in an example in FIG. 6, 23, it is illustrated that 23 timeslots constitute one superframe, the number of timeslots can be set, as appropriate.

A channel number 602 is assigned to each timeslot number 601 within the superframe by cyclically iterating the hopping pattern illustrated in FIG. 5.

A send/receive link 603 indicates that, in timeslots assigned to a send link 701 and a receive link 702, sending and receiving are performed using the respectively assigned channels for the timeslots.

<Structure of a Timeslot>

Figure 7:
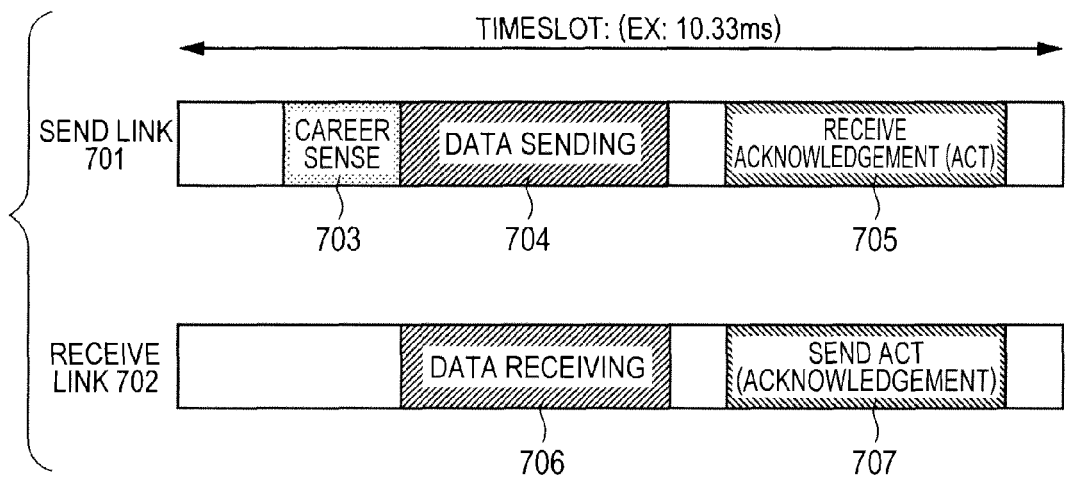
FIG. 7 is a diagram showing examples of a timeslot structures.

FIG. 7 is a diagram showing examples of structures of each timeslot. A timeslot is assumed to be roughly 10 ms and differs for the send link 701 and the receive link 702.

For the send link 701, a wireless station always performs carrier sense 703 before data sending 704 and checks for the presence of radio waves of a communication frequency. Here, the carrier sense is an operation of checking whether or not a nearby wireless station radiates radio waves of the same channel.

If the strength of detected radio waves exceeds a threshold value, the wireless station withdraws data sending 704 scheduled to send in the timeslot. On the other hand, if the strength of the radio waves falls within the threshold value, the wireless station performs data sending 704 following the carrier sense 703 and becomes ready for receiving an acknowledgement (ACK) 705.

For the receive link 702, a wireless station performs sending ACK (acknowledgement) 707 after data receiving 706.

Here, for the send link, a wireless station performs carrier sense each time a send timeslot comes and performs communication, while accumulating an interference occurrence rate that is defined by equation (1).

Interference occurrence rate=the number of times that sending was withdrawn by carrier sense/the number of times of sending attempt     (1)

The interference occurrence rate is a value per communication channel of each wireless station, accumulated in the control part 104 of each wireless station, and updated at each communication opportunity. That is, the interference occurrence rate is accumulated as information that is as much as the number of wireless stations×the number of channels.

Although, in the present embodiment, the interference occurrence rate defined by equation (1) is applied exemplarily as an indicator of communication quality, other indicators may be applied, such as, e.g., strength of received radio waves, the number of times that error correction was performed, the number of times that communication was discontinued, and packet loss rate.

<Message Sending/Receiving Process>

Figure 8:
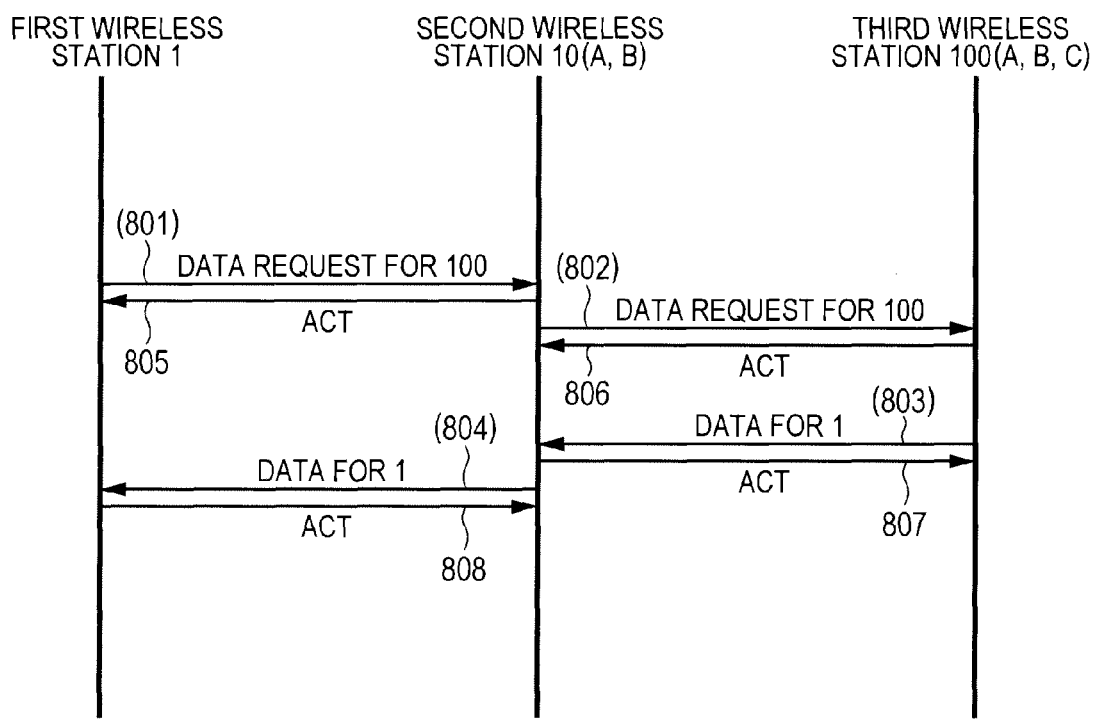
FIG. 8 is a sequence diagram for explaining a message sending and receiving process that is performed among first through third wireless stations.

FIG. 8 is a sequence flow for explaining a message sending/receiving process that is performed among the first wireless station 1, a second wireless station 10, and a third wireless station 100.

The first wireless station 1 sends a data request destined for the third wireless station 100 to the second wireless station 10 (step 801). The second wireless station 10 having received the data request destined for 100 sends the data request destined for the third wireless station 100, according to the routing table 205 (step 802).

The third wireless station 100 having received the data request destined for 100 sends sensor data destined for the first wireless station 1 as ACK (step 803).

The second wireless station 10 having received ACK from the third wireless station 100 relays the sensor data destined for the first wireless station 1 (step 804).

A wireless station, each time it has received each data request (steps 801 and 802) and sensor data (steps 803 and 804), sends back ACK to a sending station that sent the request and sensor data (steps 805, 806, 807, and 808).

Upon receiving ACK, each wireless station erases the corresponding packet from the send queue 103, 203.

In this way, the gateway wireless station (first wireless station) communicates with a destination wireless station (e.g., third wireless station) via a relay wireless station (e.g., second wireless station). Thereby, it becomes possible to access a farther wireless station and acquire data therefrom. It should be noted that a relay wireless station is not limited to one and a destination wireless station may be accessed via a plurality of relay wireless stations.

<Multi-Hop Communication>

Figure 9:
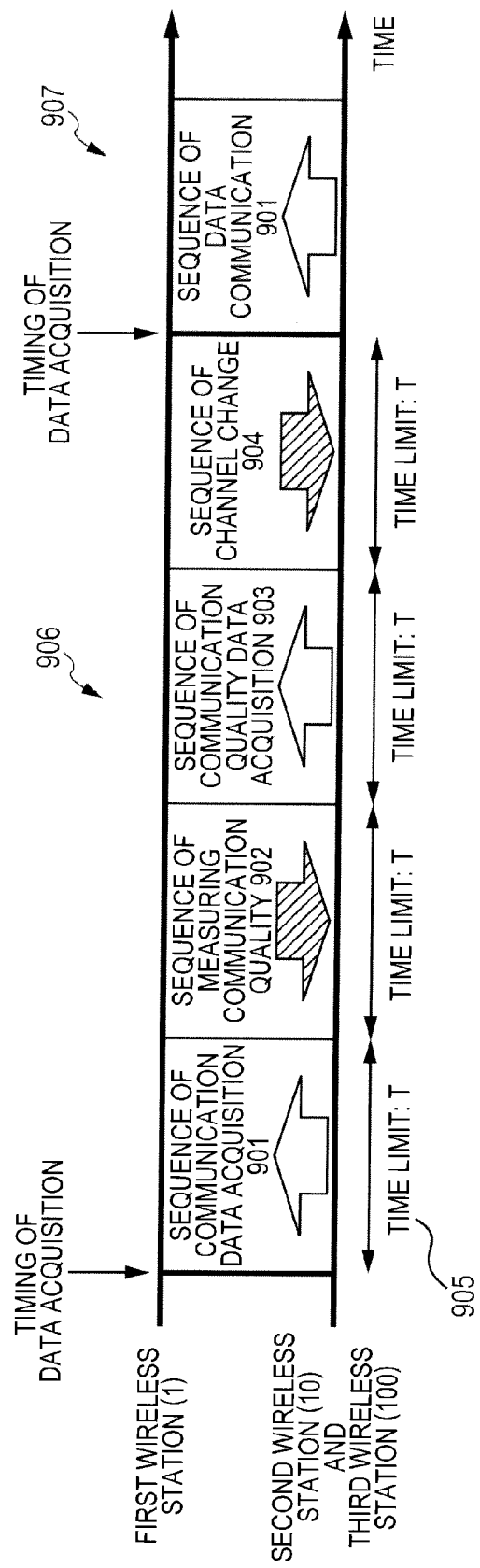
FIG. 9 is a diagram illustrating a method of multi-hop communication according to the present invention.

FIG. 9 is a diagram illustrating a method of multi-hop communication according to the present invention. In the multi-hop communication, a communication period corresponding to each of data acquisition cycles appropriate to application is divided into the following four sequences: a sequence of communication data acquisition 901, a sequence of measuring communication quality 902, a sequence of communication quality data acquisition 903, and a sequence of channel change 904. The first wireless station and second and third wireless stations cooperate and consecutively execute these sequences as one set of processes in one cycle, i.e., during a period between successive timings of data acquisition. Besides, the execution time (time limit) of each sequence is limited to T(s). It should be noted that this execution time T may be set as variable time. That is, different execution times may be set for each sequence. Alternatively, the same execution time of each sequence may be set at start of processing and may be controlled to vary depending on data acquisition status (the execution time may be set shorter for a sequence in which data acquisition and processing are fast and a longer time may be allocated to a sequence in which data acquisition and processing are slow). However, even in that case, it is desirable that a total of the execution times of the four sequences is maintained constant (4T). The sequence of communication quality data acquisition 903 and the sequence of channel change 904 may be executed once every predefined number of cycles (e.g., several tens of cycles), so that a sufficient amount of communication quality data may be accumulated. In this case, immediately after the execution of the sequence of communication quality data acquisition (just before the sequence of channel change 904), wireless stations other than the first wireless station delete the communication quality data already acquired by the first wireless station from the memory, thereby initializing the memory. Thereby, a communication channel can be set according to radio wave conditions for any given period.

In the sequence of communication data acquisition 901, sending/receiving sensor data or the like is mainly performed. In the sequence of measuring communication quality 902, the interference occurrence rate mentioned previously for each channel in the current communication environment is measured with respect to each wireless station. In the sequence of communication quality data acquisition 903, the first wireless station 1 collects communication quality data measured by each wireless station. In the sequence of channel change 904, the wireless station 1 creates a hopping pattern comprised solely of channels having less interference, based on channel information acquired in the sequence of communication quality data acquisition 903 and instructs each wireless station to make a change to a new hopping pattern. As mentioned above, a time limit T 905 is set for each sequence. Accordingly, even when a sequence is unfinished, processing proceeds to the next sequence. Thus, this avoids that a delayed sequence influences and delays other sequences and, consequently, cyclically stable data acquisition can be carried out.

Here, a value of T is assumed to be roughly several seconds (such as 4 s) by way of example and larger than 250 ms given as an example of a time scale of a superframe in FIG. 6. It is assumed that roughly 10 to 20 superframes are contained within the time T.

<Communication Data Acquisition Sequence and Communication Quality Data Acquisition Sequence>

Figure 10:
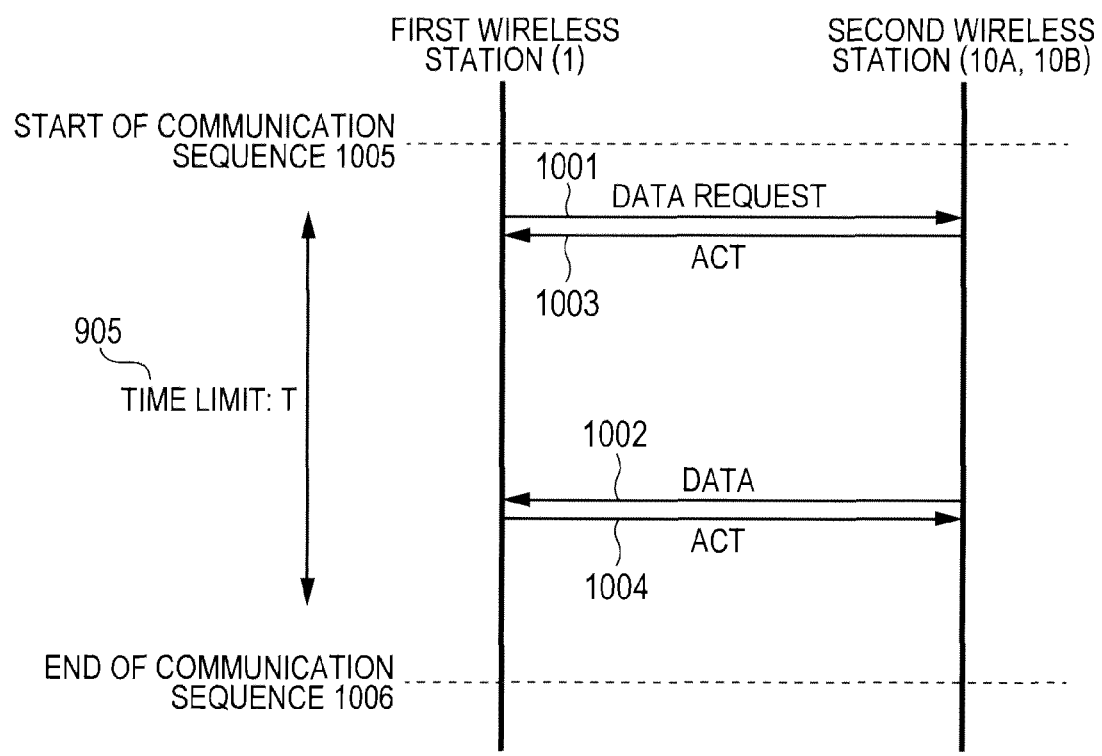
FIG. 10 is a diagram for explaining a sequence of a message sending and receiving process in a sequence of communication data acquisition 901 and a sequence of communication quality data acquisition 903.

FIG. 10 is a diagram for explaining a sequence of a message sending/receiving process in the sequence of communication data acquisition 901 and the sequence of communication quality data acquisition 903. Although a flow of message exchange between the first wireless station 1 and a second wireless station 10 is shown in FIG. 10 for simplicity of description, the same description can also apply to a case of multi-hop message exchange including a third wireless station 100. "Data" mentioned in FIG. 10 means communication data or communication quality data.

In FIG. 10, the first wireless station 1 judges the start of a communication sequence 1005 (the end of a preceding sequence (the sequence of channel change 2904 in the example of FIG. 9) and sends a data request to the second wireless station (step 1001).

Upon receiving the data request from the first wireless station 1, the second wireless station 10 promptly sends back ACK (step 1003) and sends data by a send link to the first wireless station 1 (step 1002).

Upon receiving the data from the second wireless station 10, the first wireless station 1 promptly sends ACK (step 1004)

Upon elapse of a time limit T905 from the start of the communication sequence 1005, the communication sequence terminates (step 1006). Even if each of the sequence of communication data acquisition 901 and the sequence of communication quality data acquisition 903 is unfinished completely, processing proceeds to the next sequence. This enables periodical sequence execution without influencing the start/end time of subsequent sequences. Communication data (sensor data) and communication quality data (interference occurrence rate) not yet acquired in the current cycle (e.g., cycle 906) are to be acquired in the next cycle (e.g., cycle 907).

<Operations of the First Wireless Station in the Communication Data Acquisition Sequence and Communication Quality Data Acquisition Sequence>

Figure 11:
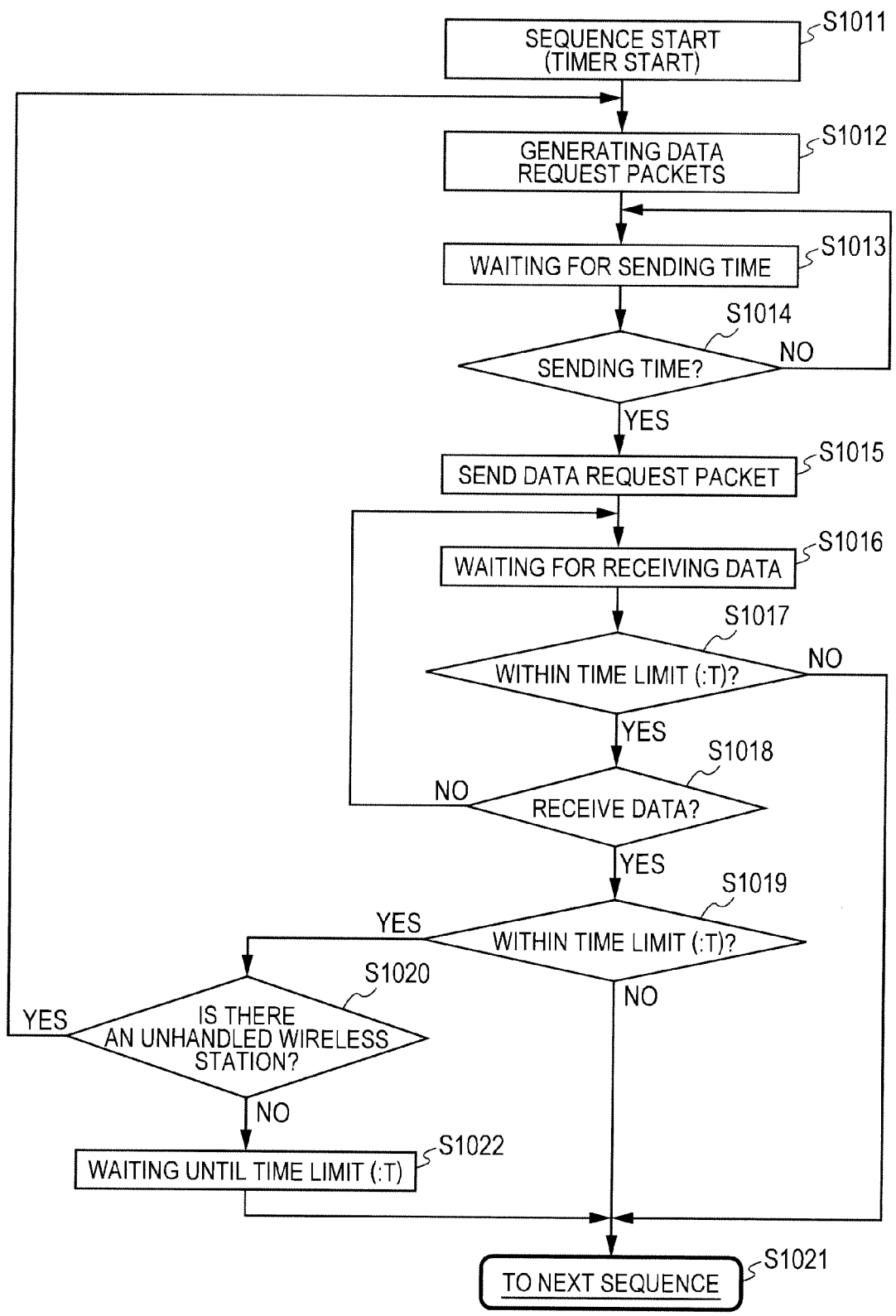
FIG. 11 is a flowchart for explaining the operations of the first wireless station 1 in the sequence of communication data acquisition and the sequence of communication quality data acquisition.

FIG. 11 is a flowchart for explaining the operations of the first wireless station 1 in the sequence of communication data acquisition and the sequence of communication quality data acquisition. In the sequence of communication data acquisition 901 and the sequence of communication quality data acquisition 903, the wireless station 1 performs the following operations using the control part (processor) 104.

Upon judging the sequence start 1011, the control part 104 first activates a timer and consecutively measures time from the sequence start (S1011).

Then, the control part 104 generates data request packets destined for second and third wireless stations 10 and 100 (S1012) and waits, while repeating waiting for sending time (S1013) and checking if it gets to the sending time (S1014) until a send link 701 comes. Here, the control part is able to generate a plurality of data request packets in a batch.

When the sending time comes, the control part 104 sends a data request packet (S1005) and process to a step of waiting for receiving data (S1016).

Then, the control part 104 checks if elapsed time is within a time limit T (S1017). If it is within T, the control part 104 checks if its own station receives data (S1018); if it is equal to or over T, the control part proceeds to the next sequence (S1021). If the sequence being executed now is the sequence of communication data acquisition 901, the control part proceeds to the sequence of measuring communication quality 902. If the sequence being executed now is the sequence of communication quality data acquisition 903, the control part proceeds to the sequence of channel change 904.

If its own station does not receive data in the step of checking if its own station receives data (S1018), the control part 104 returns to the step of waiting for receiving data (S1016). If its own station receives data, the control part rechecks if it is within the time limit T (S1019). If it is over the time limit T, as judged at the step S1019, processing promptly proceeds to the next sequence (S1021).

If it is within the time limit T, as judged at the step S1019, the control part 104 checks whether or not there is an unhandled wireless station, thereby determining if generating a data request packet is needed (S1020). If generating a data request packet is needed, the control part repeats the step of generating a data request packet (S1012) and subsequent steps; if doing so is not needed, the control part waits until the time limit T (S1022). When the time limit comes, the control part proceeds to the next sequence (S1021).

<Communication Quality Acquisition Sequence>

Figure 12:
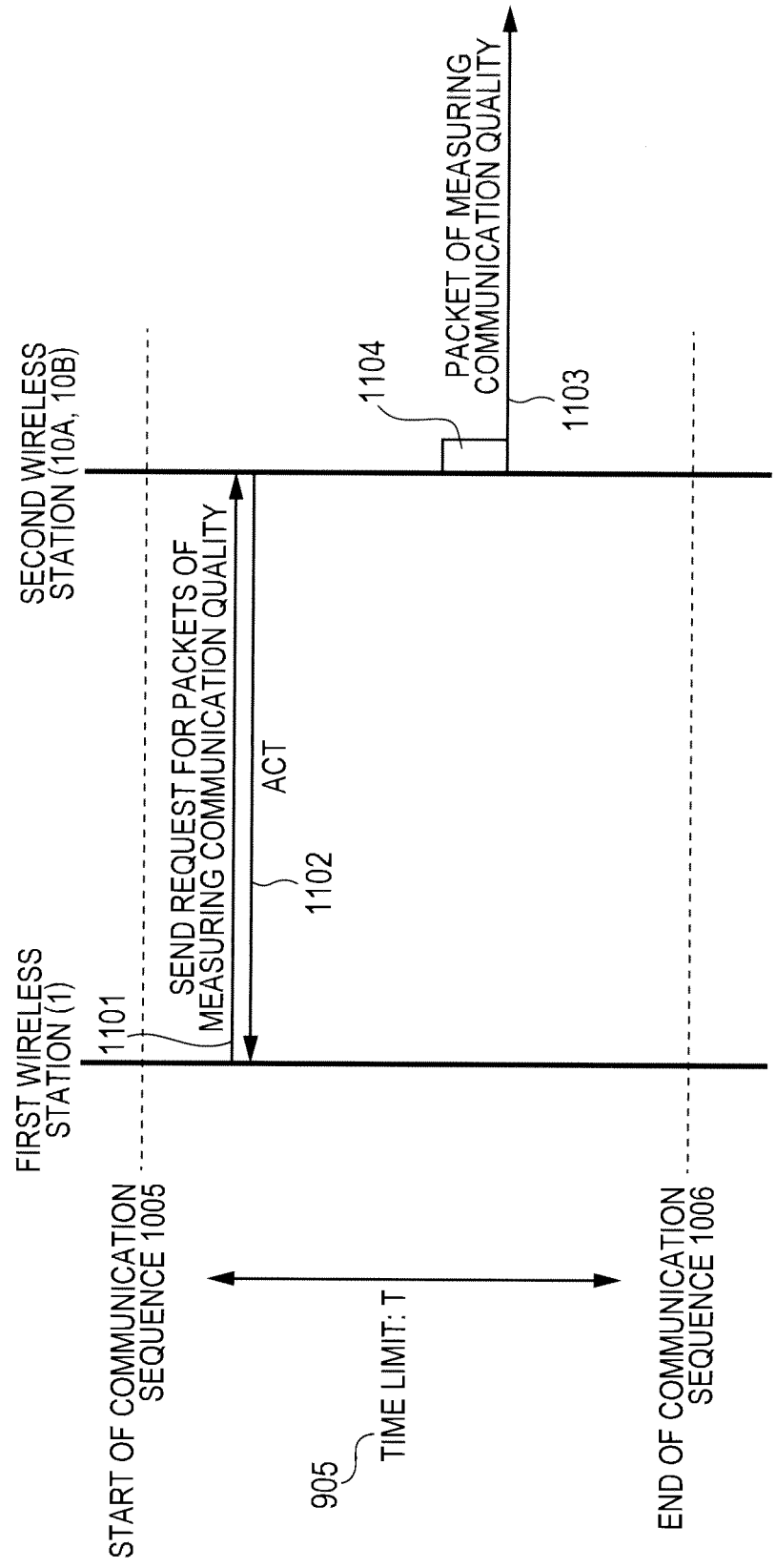
FIG. 12 is a diagram for explaining a sequence of a communication quality acquisition process in a communication quality acquisition sequence.

FIG. 12 is a diagram for explaining a sequence of a communication quality acquisition process in a communication quality acquisition sequence.

In a sequence of measuring communication quality 902, the first wireless station 1 sends a send request for packets of measuring communication quality to a second wireless station 10 (step 1101).

The second wireless station 10 having received the send request for packets of measuring communication quality sends back ACK to the first wireless station 1 (step 1102).

Then, the second wireless station 10 performs carrier sense 1104 (step 1104) and sends a packet of measuring communication quality (step 1103) within a send link timeslot. Here, the packet of measuring communication quality is the packet with the address of a virtual wireless station that does not exist actually described as the destination address. Hence, there may be no wireless station that receives this packet.

Upon elapse of a time limit T905 from the start of the communication sequence 1005, the communication sequence terminates (step 1006). As is the case for the sequence of communication data acquisition 901 and the sequence of communication quality data acquisition 903, even if all steps of the process of measuring communication quality are not finished, processing proceeds to the next sequence (sequence of communication quality data acquisition 903). This enables periodical sequence execution without influencing the start/end time of subsequent sequences.

<Operations of the First Wireless Station in the Communication Quality Data Acquisition Sequence>

Figure 13:
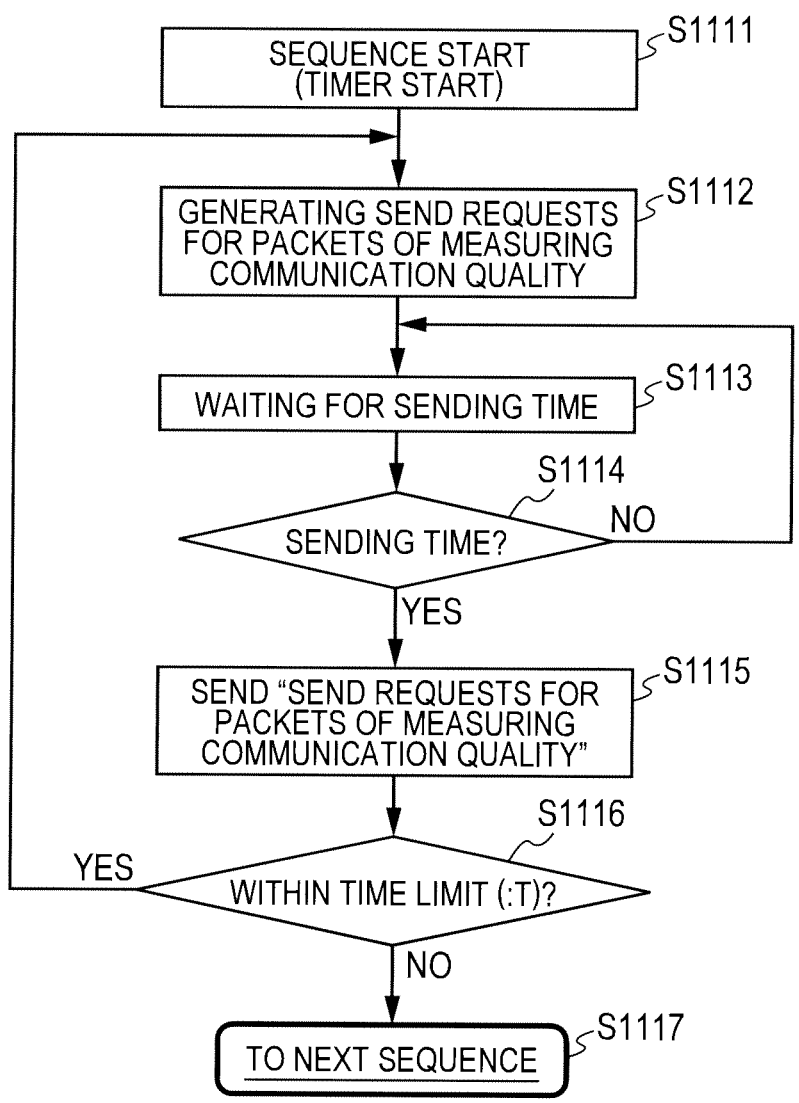
FIG. 13 is a flowchart for explaining the operations of the first wireless station 1 in a sequence of measuring communication quality 902.

FIG. 13 is a flowchart for explaining the operations of the first wireless station 1 in the sequence of measuring communication quality 902.

At the start of the sequence, the control part 104 starts timer operation (S1111) and generates send requests for packets of measuring communication quality (S1112).

The control part 104 puts the generated send requests for packets of measuring communication quality into the send queue 103 and waits for sending time, while judging whether or not it gets to the sending time (S1113 and S1114).

When the sending time comes, the control part 104 sends the send requests for packets of measuring communication quality to second wireless stations 10 (S1115).

Then, the control part 104 checks if it is within a time limit T (S1116). If it is within T, the control part generates next send requests for packets of measuring communication quality (S1112) and repeats the above steps (S1113 to S1116).

If it is over the time limit T, the control part 104 promptly makes processing proceed to the next sequence (sequence of communication quality data acquisition 903) (S1117).

<Operations of a Second Wireless Station in the Communication Quality Data Acquisition Sequence>

Figure 14:
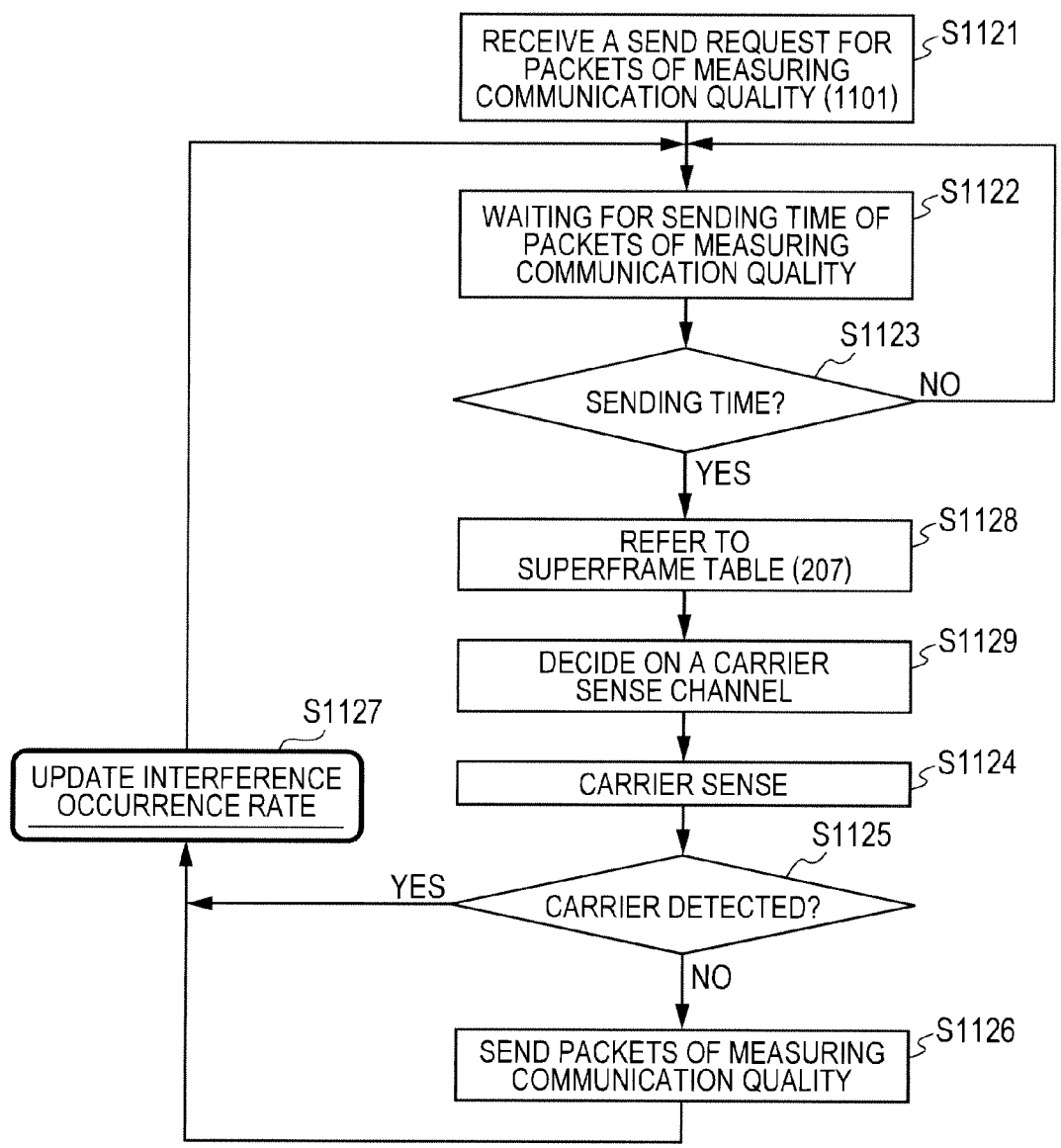
FIG. 14 is a flowchart for explaining the operations of a second wireless station 10 in the sequence of measuring communication quality 902.

FIG. 14 is a flowchart for explaining the operations of a second wireless station 10 in the sequence of measuring communication quality 902.

Upon receiving a send request for packets of measuring communication quality (S1121) from the first wireless station 1, the control part 204 of a second wireless station 10 waits for sending time, while judging whether or not it gets to the sending time (S1122 and S1123).

When the sending time comes, the control part 204 refers to the superframe table 207 (S1128), decides on a carrier sense channel (S1129), and then performs carrier sense (S1124).

Then, the control part 204 judges whether a carrier has been detected (S1125). If a carrier has been detected, the control part 204 updates the interference occurrence rate it holds according to the above-described equation (1) (S1127).

Otherwise, if no carrier has been detected, the control part 204 sends a packet of measuring communication quality and updates (S1126) and then updates the interference occurrence rate (S1127).

Figures 15, 16:
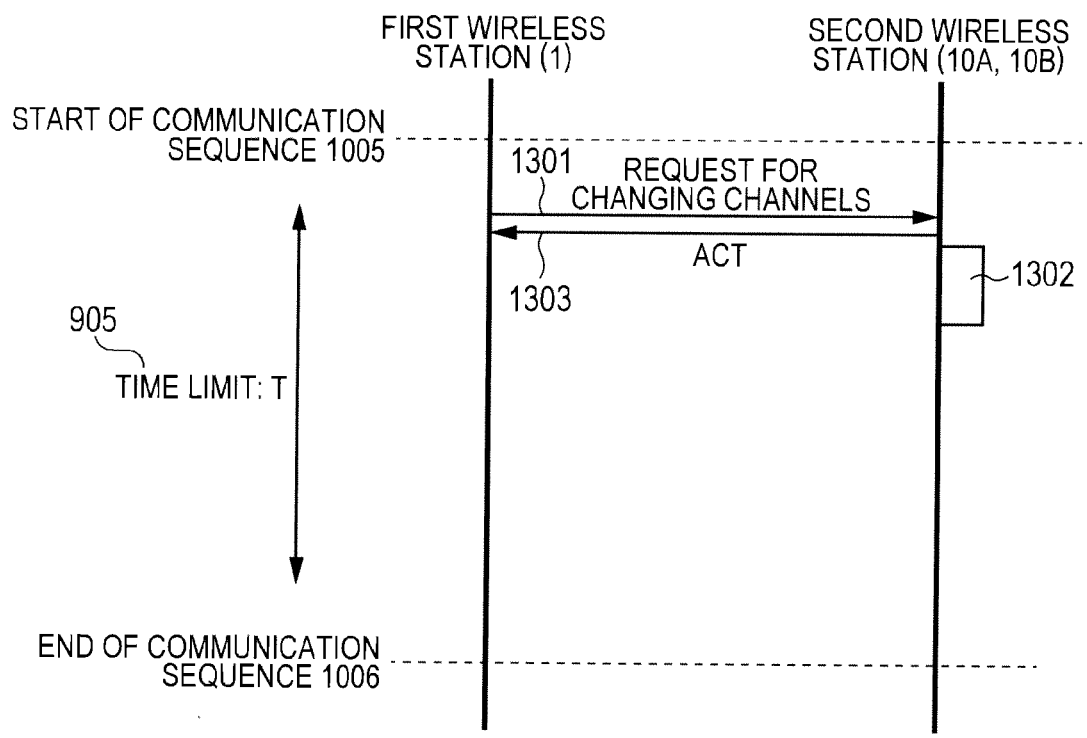
FIG. 15 is a diagram showing an example of interference occurrence rates for each channel.
FIG. 16 is a diagram for explaining a message processing sequence in a sequence of channel change 904.

Communication quality (interference occurrence rate) acquired and updated by the above-described process is held in an interference occurrence rate management table which is shown in FIG. 15 and managed as information subject to successive change.

<Channel Change Sequence>

FIG. 16 is a diagram for explaining a message processing sequence in the sequence of channel change 904.

Upon judging the start of the communication sequence (step 1005), the first wireless station 1 sends a request for changing channels to a second wireless station 10 (step 1301).

Upon receiving the request for changing channels, the second wireless station 10 sends back ACK to the request (step 1303) and executes changing channels according to channel change information included in the request for changing channels 1301 (step 1302).

Upon elapse of a time limit T905 from the start of the communication sequence, the communication sequence terminates (step 1006). In the same manner as described previously, even if required processing for channel change is unfinished completely, processing proceeds to the next sequence (sequence of communication data acquisition 901). This enables periodical sequence execution without influencing the start/end time of subsequent sequences.

<Operations of the First Wireless Station in the Channel Change Sequence>

Figure 17:
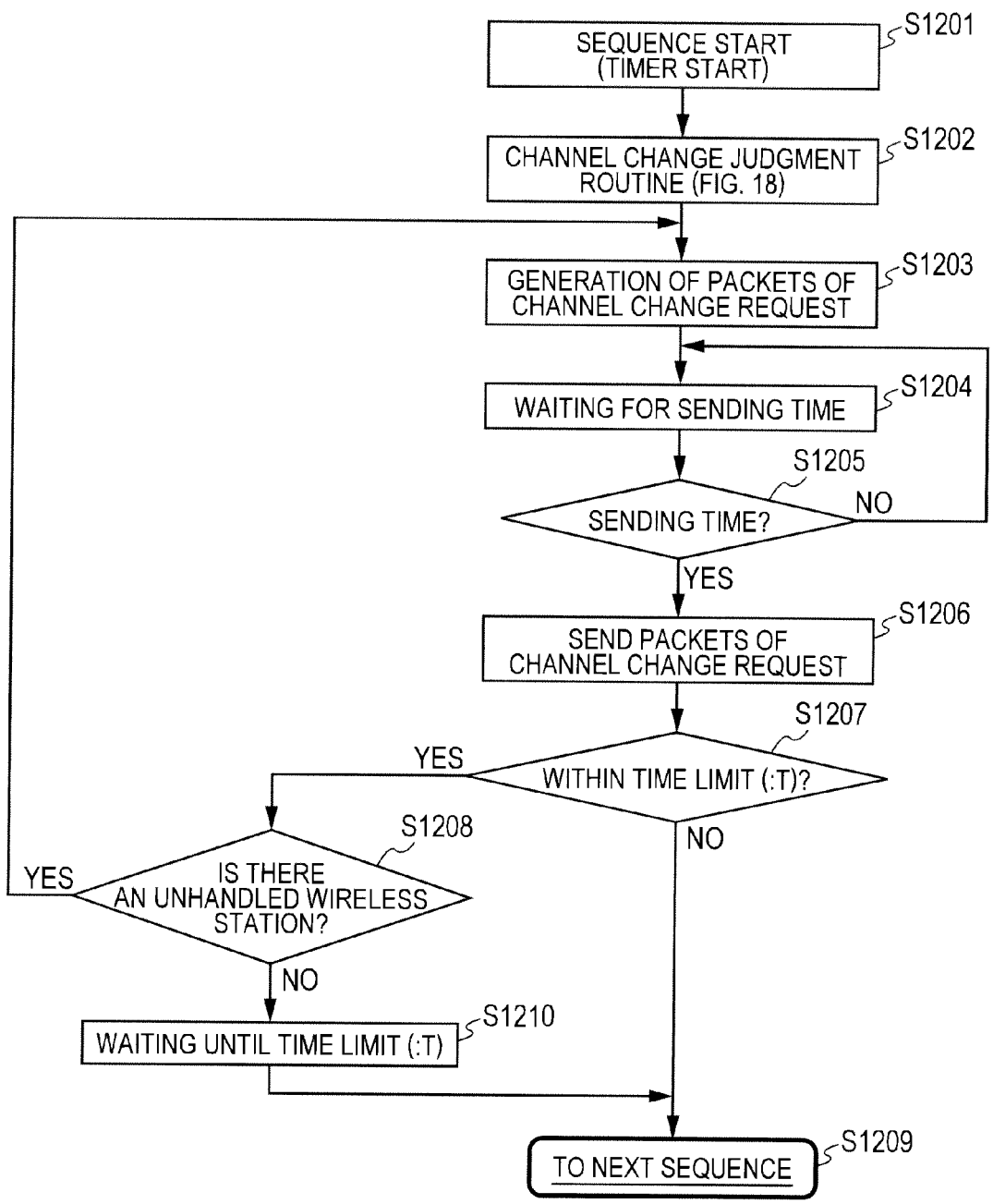
FIG. 17 is a flowchart for explaining the operations of the first wireless station 1 in the sequence of channel change 904.

FIG. 17 is a flowchart for explaining the operations of the first wireless station 1 in the sequence of channel change 904.

The control part 104 activates a timer in conjunction with the sequence start and measures elapsed time (S1201).

Then, the control part 104 executes a channel change judgment routine (see FIG. 18) (S1202). Using a new hopping pattern generated by executing this routine, the control part generates packets of channel change request (S1203).

In turn, the control part 104 waits for sending time, while judging whether or not it gets to the sending time (S1204 and S1205). When the sending time comes, the control unit sends the packets of channel change request (S1206).

After that, the control part 104 judges whether or not it is within a time limit T (S1207). If it is over the time limit T, the control unit promptly makes processing proceed to the next sequence (sequence of communication data acquisition 901) (S1209).

If it is within the time limit T, as judged at the step S1207, the control part 104 checks whether or not there is a terminal (wireless station) to which the packet is not yet sent (S1208).

If there is a terminal to which the packet is not yet sent, the control part 104 repeats generating packets of channel change request (S1203). If there is no terminal to which the packet is not yet sent, the control part waits until the time limit T (S1210) and makes processing proceed to the next sequence (sequence of communication data acquisition 901).

After the first wireless station acquires communication quality on each wireless station, each terminal deletes communication quality information from the memory. Thereby, each terminal can send channel information only within a given period to the first wireless station. Consequently, even if a radio environment has changed, it is possible to early respond to the change in the radio environment, since information before the change is deleted from the memory.

<Details of a Channel Change Judgment Process>

Figure 18:
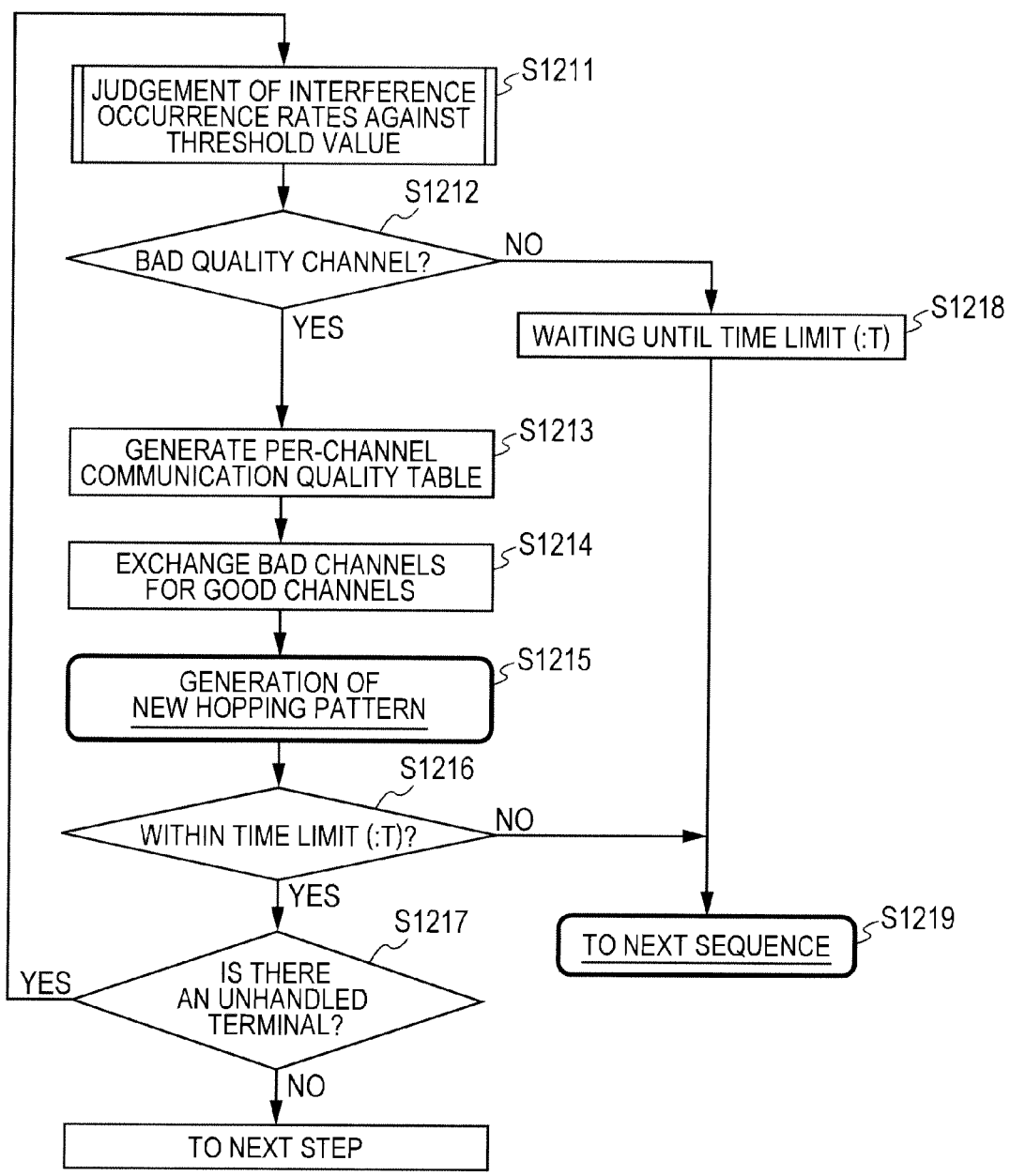
FIG. 18 is a flowchart for explaining the details of a channel change judgment routine (S1202) in FIG. 17.

FIG. 18 is a flowchart for explaining details of the channel change judgment routine (S1202) in FIG. 17.

First, the control part 104 judges the interference occurrence rate of each wireless station received in the sequence of communication quality data acquisition 903 against a threshold value (S1211). That is, the value of each occurrence rate is compared against a threshold value that has been set beforehand and whether or not it exceeds the threshold value is determined.

Then, the control part 104 judges whether or not there is a bad quality channel (exceeding the threshold value) (S1212). Unless there is a bad quality channel, the control part 104 waits until the time limit T elapses (S1218) and makes processing proceed to the next sequence (sequence of communication data acquisition) (S1219). This is because, unless there is a bad quality channel, the current hopping pattern does not need to be updated.

Otherwise, if there is a bad quality channel, the control part 104 generates a per-channel communication quality table (see FIG. 19) (S1213). In an example shown in FIG. 19, communication quality of each channel is marked O (good) or X (bad) as a result of judging each value from the table of interference occurrence rates as shown in FIG. 15 against a threshold value setting of 20%.

Next, the control part 104 replaces bad quality channels with good quality channels (S1214) and generates a new hopping pattern for each wireless station (S1215).

Then, the control part 104 checks if it is within the time limit T (S1211). If it is within T, the control part checks if there is an unhandled terminal (S1216) and repeats processing from the step S1211 until there is no longer an unhandled terminal. When there is no longer an unhandled terminal, processing proceeds to the step S1203 (FIG. 17).

Otherwise, if it is over the time limit T, the control part 104 does not execute the step S1203 and subsequent steps in FIG. 17 and makes processing to the next sequence (sequence of communication data acquisition) (S1219). In this case, an updated hopping pattern for wireless stations (terminals) whose channel quality has been judged is held in a memory not shown and the channel change judgment process to be continued is executed again in the next cycle.

(2) Second Embodiment

Figure 20:
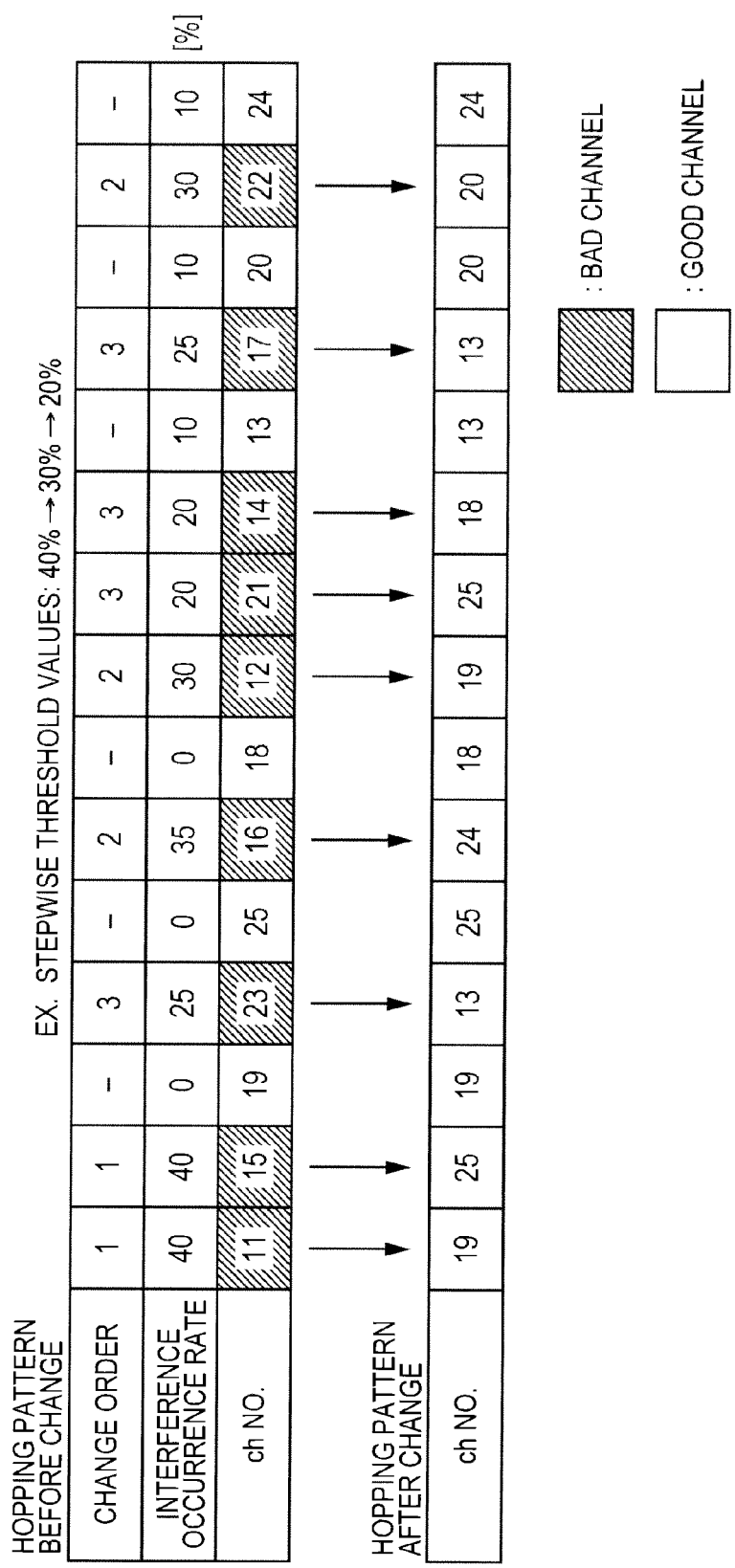
FIG. 20 is a diagram is a diagram for explaining a concept of judgment of interference occurrence rates based on stepwise threshold values/

In a second embodiment of the present invention, in the sequence of channel change 904, judgment of interference occurrence rates against a threshold value is performed in a stepwise fashion and a hopping pattern is updated each time the judgment is made. FIG. 20 is a diagram showing an example of such judgment based on stepwise threshold values according to the second embodiment.

Even if judgment of interference occurrence rates is finally made against a threshold value of 20%, such judgment is executed while changing the criterion threshold from 40% to 30% and to 20%. Specifically, the control part 104 judges interference occurrence rates against a threshold value of 40%, 30%, and 20%, respectively and generates a new hopping pattern in each case (S1215). Then, the control part 104 sends packets of channel change request (S1206), thereby rewriting the hopping patterns of second wireless stations 10.

Then, the control part 104 checks if it is within the time limit T (S1207). If it is within T, the control part further checks if there is an unhandled terminal (S1208). If so, for an unhandled terminal, the control part executes the above judgments against a threshold value of 30% and 20% and rewrites the hopping pattern of the terminal in turn.

The reason why channels are changed in a stepwise fashion as above is as follows. Such a situation may happen that a request for changing channels (step 1301) from the first wireless station 1 has been received by a second wireless station 10, but its ACK (step 1303) does not yet arrive at the first wireless station 1. In such a case, it follows that the first wireless station 1 uses a hopping pattern before change, whereas the second wireless station uses a new hopping pattern.

In a case that a majority of channels are bad quality channels, for example, as is shown in FIG. 21, because of many channels changed, communication is discontinued for a certain period and it takes time before recovery from channel change, even if the first wireless station 1 retransmitted a request for changing channels.

However, by performing judgment of interference occurrence rates against a threshold value and channel change in a stepwise fashion as in the present embodiment, a period of discontinued communication can be curtailed to a minimum, even if it happens that different hopping patterns are used by the first wireless station 1 and the second wireless stations 10.

(3) Third Embodiment

In a third embodiment of the present invention, in one set of processes, i.e., the sequence of communication data acquisition 901, the sequence of measuring communication quality 902, the sequence of communication quality data acquisition 903, and the sequence of channel change 904, timeslots 1401 and 1402 specifically for quality measurement are provided in a superframe.

FIG. 22 is a diagram showing an example of a superframe structure according to the third embodiment. In FIG. 22, as for timeslots other than the timeslots 1401 and 1402 specifically for quality measurement, a hopping pattern is changed according to the communication environment, as described previously.

On the other hand, for the timeslots 1401 and 1402 specifically for quality measurement, hopping is performed using all channels in the band, even if a hopping pattern is changed.

When a hopping pattern is changed, quality measurement can be performed only for channels included in a hopping pattern after being changed in the sequence of measuring communication quality 902. In a case in which a channel judged as a bad quality channel has become a good quality channel later, such channel cannot be included in the hopping pattern. However, by introducing the timeslots 1401 and 1402 specifically for quality measurement, reuse of channels becomes possible and thus efficient communication can be performed. The operations in the timeslots 1401 and 1402 specifically for quality measurement are the same as in the sequence of measuring communication quality 902. By the way, the number of the timeslots specifically for quality measurement is not limited to two.

(4) Fourth Embodiment

Figure 23:
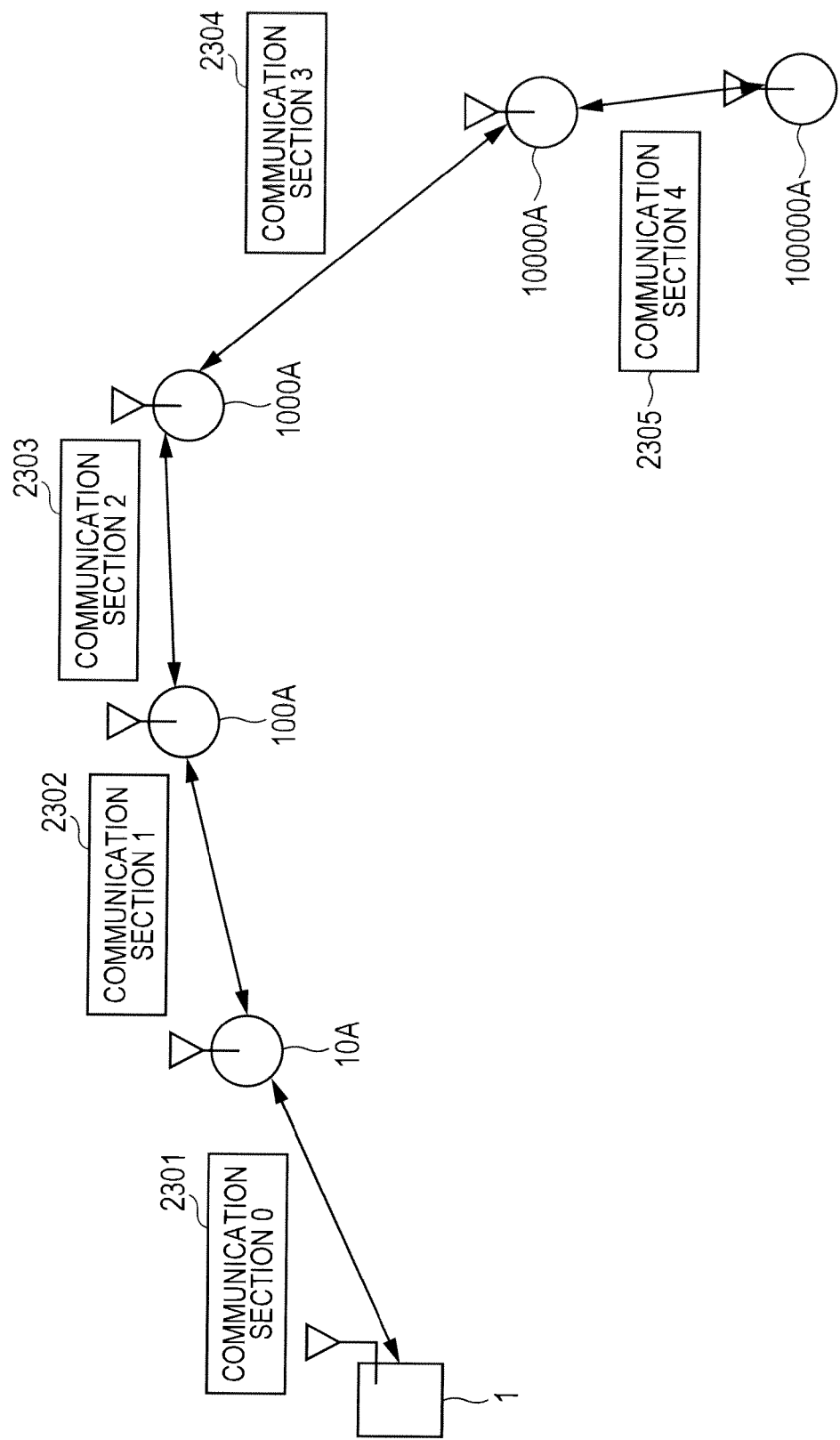
FIG. 23 is a diagram showing an example of a schematic structure of a wireless communication system according to a fourth embodiment.

A fourth embodiment of the present invention relates to a multi-hop communication system. FIG. 23 is a diagram showing an example of a structure of the communication system according to the fourth embodiment. Here, an example of multi-hop communication with five hops is presented for explanatory purposes, but there is no limitation to this. FIG. 23 shows a wireless communication system in which a first wireless station 1 and second through sixth wireless stations (respectively denoted by reference numerals 10A, 100A, 1000A, 10000A, and 100000A) carry out multi-hop communication via communication sections 0 to 4 (respectively denoted by reference numerals 2301, 2302, 2303, 2304, and 2305).

Figure 24:
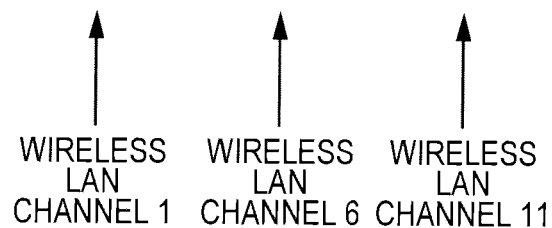
FIG. 24 is a diagram showing an example of dividing channels into groups.

In the present embodiment, when changing a hopping pattern in the sequence of channel change 904, channels are divided into five groups (Groups A to E) as illustrated in FIG. 24 and the control part 104 of the first wireless station 1 permits changing among channels belonging to each group. For example, as for Group_A, channel change is performed only among channels 11, 16, and 21. Here, channel numbers 11 to 25 are wireless channels in the 2.4 GHz band, as illustrated in the first embodiment subsection. Channels 1, 6, and 11 in FIG. 24 correspond to a low frequency band (ch1), a middle frequency band (ch6), and a high frequency band (ch11) of wireless LAN in the 2.4 GHz band. In this way, by dividing the channels into groups and permitting channel change only among channels belong to each group, if interference has occurred, for example, in a low frequency band, it is possible to make change to a channel in a high frequency band (or middle frequency band) away from the low frequency band. Therefore, it is possible to construct a hopping pattern in which interference of a wireless LAN (example) as a source of interference is suppressed. Reducing packet retransmissions and a low-delay communication can be achieved.

Figure 25:
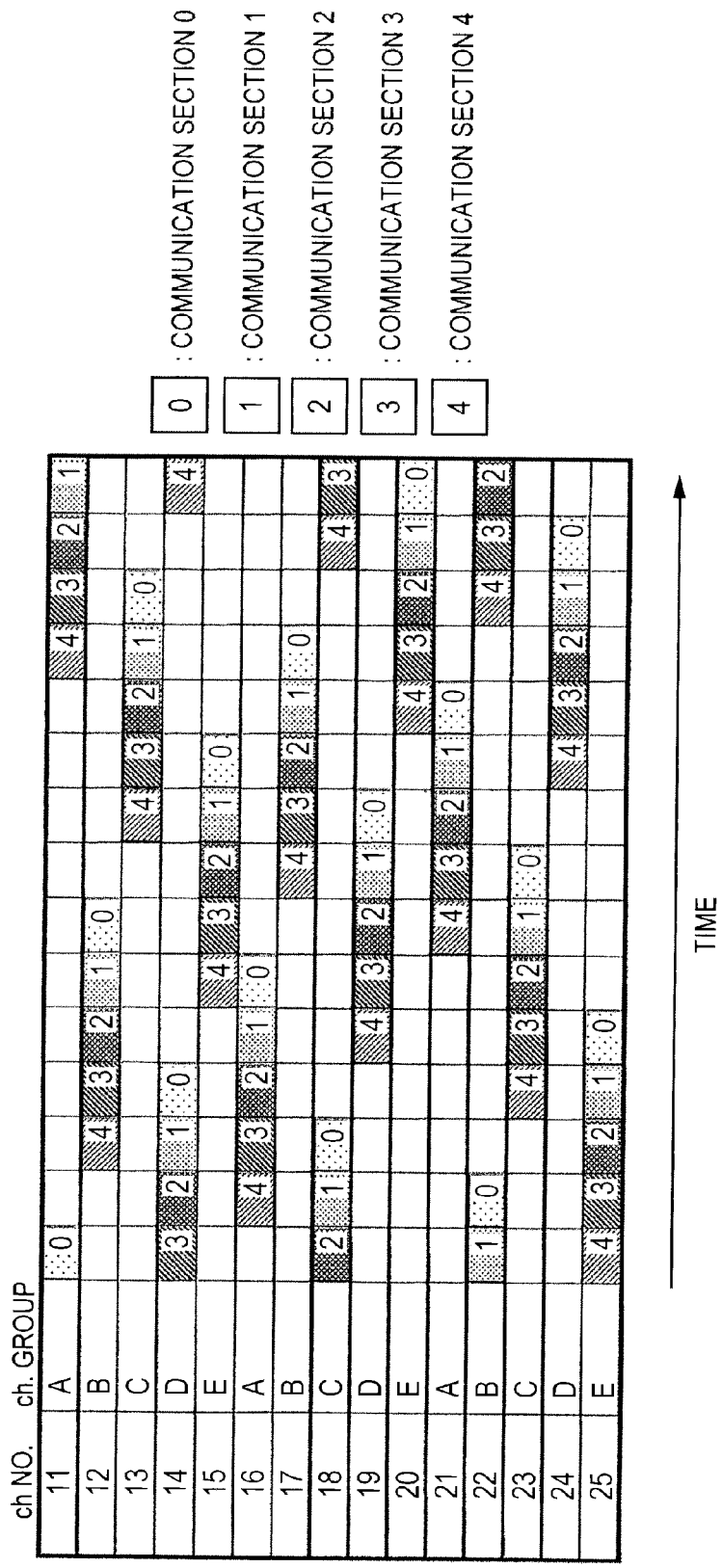
FIG. 25 is a diagram showing an example of constructing hopping patterns according to the fourth embodiment.

Besides, by dividing the channels into groups, the control part 104 of the first wireless station 1, when creating hopping patterns for communication sections 0 to 4 (reference numerals 2301 to 2305), is allowed to select a hopping pattern in such a way: a channel in Group_A→a channel in Group_B→ . . . →a channel in Group_G, as is shown in FIG. 25. Thereby, it become possible to perform communication using different frequencies at the same time in each of the communication sections 0 to 4 (2301 to 2305). Consequently, efficient communication can be achieved. According to FIG. 25, for example, in a communication section 0, communication is performed using a channel for each timeslot in the following order: channel 11→22→18→14→ . . . →13→24→20. In a communication section 1, communication is performed using a channel for each timeslot in the following order: channel 22→18→14→25→ . . . →24→20→11. In communication sections 2 to 4 as well, channels in use can be determined similarly referring to FIG. 25.

Although, in the above description, the use of the channels in the 2.4 GHz band, defined in IEEE 802.15.4, is assumed and, as a source of interference, a wireless LAN operating in the same frequency band is given as an example, a communication frequency band and a source of interference may be possible in any other frequency band. Although the communication channels are divided into five groups in the present embodiment, the channels may be divided into any other number of groups.

(5) Fifth Embodiment

A fifth embodiment relates to processing in a case where a plurality of communication stations shares and uses a same timeslot, that is, a plurality of communication stations have a same superframe table 207. Here, the plurality of communication stations may be communication stations 10 of second wireless stations 10 or third wireless stations 100 two hops ahead of the first wireless station. The above communication stations may be a plurality of wireless stations including second wireless stations 10 and third wireless stations 100 and the number of these stations is unlimited.

Figure 26:
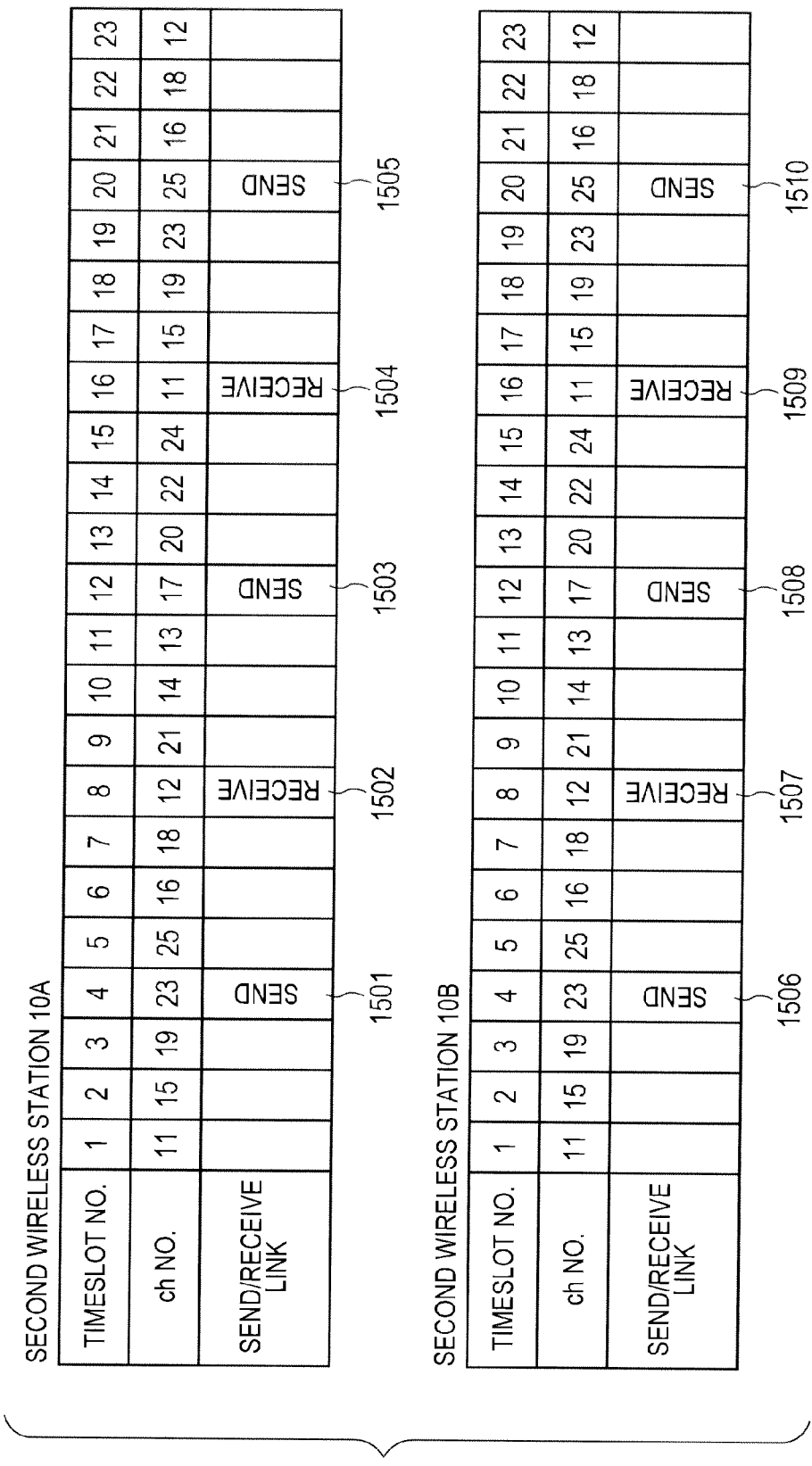
FIG. 26 is a diagram for explaining shared timeslots.

For simplicity of description, a case where second wireless stations 10A and 10B hold a same superframe table, as is shown in FIG. 26, is considered as an example. If a plurality of communication stations share a send/receive link in a same timeslot, a packet collision may occur in the system in some situations. To avoid this, in the present embodiment, to avoid this, the first wireless station is arranged to send a data request 1611 to each communication station 10A and 10B in order that has been set beforehand in the control part 104.

<Sequence of Data Sending/Receiving Process>

FIG. 27 is a diagram for explaining an example of a data sending/receiving process sequence assumed in the fifth embodiment.

In FIG. 27, the first wireless station 1 sends a data request to a second wireless station 10A (step 1611), receives ACK from the second wireless station 10A (step 1612), and finally waits for data sent back (step 1613). Meanwhile, the second wireless station 10A may not receive a data reception ACK 1614 from the first wireless station 1. In this case, it follows that the second wireless station 10A repeats data retransmission. Once the first wireless station 1 has received data from the second wireless station 10A (step 1613), it sends a data request to a second wireless station 10B (step 1615) and collects data from the second wireless station 10B (step 1617). Here, sending data requests (steps 1611 and 1615) and data sending/receiving (steps 1613 and 1618) may be data requests (steps of sending/receiving a request for communication data and a request for communication quality data) and data sending (steps of sending/receiving communication data and communication quality data) illustrated in the first embodiment subsection.

<Structure of a Timeslot>

FIG. 28 is a diagram showing examples of timeslot structures for second wireless stations 10A and 10B which share a superframe table. In the present embodiment, the control parts 204 of the second wireless stations 10A and 10B are arranged to perform carrier sense with a time difference in a way different from the first embodiment (see FIG. 7). This time difference is provided between an offset 1707 before the start time of carrier sense 1701 to be performed by the station 10A and an offset 1708 before the start time of carrier sense 1704 to be performed by the station 10B.

For example, if the second wireless station 10A failed to receive ACK (step 1614) in FIG. 27 because of radio interference, a data packet remains in the send queue 203 of the second wireless station 10A and is to be retransmitted at the next sending time. However, the data packet has arrived at the first wireless station 1 by the step 1613 and, consequently, the first wireless station 1 sends a data request destined for the second wireless station 10B (step 1615). In response to this request, the second wireless station 10B sends data to the first wireless station 1 (step 1617).

However, the second wireless station 10A and the second wireless station 10B has the same superframe table 207 as in FIG. 26. Thus, the coincidence between timing at which data is retransmitted by the second wireless station 10A (timing of step 1613) and timing at which data is sent by the second wireless station 10B (timing of step 1617) causes collision of packets.

Therefore, as shown in FIG. 28, the time difference is provided between offset 1707 before the start time of carrier sense 1701 to be performed by the second wireless station 10A and offset 1708 before the start time of carrier sense 1704 to be performed by the second wireless station 10B. Thereby, even in the case in which timing at which data is retransmitted by the second wireless station 10A (timing of step 1613) coincide with timing at which data is sent by the second wireless station 10B (timing of step 1617), the second wireless station 10B will send a packet at earlier timing. Thus, the second wireless station 10A can detect data sending 1705 by the second wireless station 10B (corresponding to step 1617) and can withdraw data sending 1702 (step 1613; data retransmission). It is thus possible to reduce a delay of data packet sending 1705 (corresponding to step 1617) by the second wireless station 10B. Data sent by the second wireless station 10A has already arrived at the first wireless station 1 by the step 1613. Thus, sending/receiving without a delay due to discontinued communication, while avoiding packet collision, becomes possible.

(6) Sixth Embodiment

A sixth embodiment relates to setting up priorities of packet sending in order reverse to the order of sending to each wireless station with respect to the send queue 103 of the control part 104 of the first wireless station 1. In the foregoing fifth embodiment, after sending/receiving with respect to the second wireless station 10A, sending a data request to the second wireless station 10B and receiving data therefrom are performed. However, in the sixth embodiment, in the send queue 103 of the first wireless station 1, the priority of packet sending to the second wireless station 10B is set higher than the second wireless station 10A.

<Setting in the Send Queue>

FIG. 29 is a diagram showing an example of setting in the send queue 103 according to the sixth embodiment.

Without priority control as noted above, the following situation may occur. If the first wireless station 1 failed to receive ACK (step 1612) to a data request (step 1611) destined for the second wireless station 10A because of radio interference or the like, the data request (request to be sent by the step 1611) remains in the send queue 103 of the first wireless station, though data from the second wireless station 10A is received (step 1613).

However, because the first wireless station 1 has received data sent by the second wireless station 10A by the step 1613, it stores a data request destined for the second wireless station 10B (request to be sent by the step 1615) into the send queue 103. Therefore, in the send queue 103, the data request destined for the second wireless station 10A (request to be sent by the step 1611) and the data request destined for the second wireless station 10B (request to be sent by the step 1615) coexist. Consequently, the data request destined for the second wireless station 10A is to be sent earlier by the step 1611 and the data request to the same destination (second wireless station 10A) is duplicated.

Therefore, as shown in FIG. 29, the priority of packet sending to the second wireless station 10B is set higher than the station 10A in the send queue of the first wireless station 1. Thereby, even in the case in which the first wireless station 1 failed to receive ACK (to be received in the step 1612) to the data request (to be sent in the step 1611) destined for the second wireless station 10A and the data request destined for the second wireless station 10A (request to be sent by the step 1611) and the data request destined for the second wireless station 10B coexist in the send queue, it is possible to earlier send the data request destined for the second wireless station 10B (request to be sent by the step 1615). A packet management table that is held by the send queue 103 is shown in FIG. 30.

In the situation set up as an example in the sixth embodiment, because data communication between the first wireless station 1 and the second wireless station 10A is completed as described above, there is no problem even if communication with the second wireless station 10A takes place again after completion of communication with the second wireless station 10B. Therefore, duplicated communication can be avoided and sending/receiving without a delay due to discontinued communication becomes possible.

Although the present embodiment has been illustrated in the case of communication between the first wireless station 1 and the second wireless stations 10A and 10B, by implementing the same control as described above also when the second wireless stations 10A and 10B communicates with third wireless stations 100A to 100C, a delay involved in sending/receiving can be reduced.

(7) Overview (i) The communication system according to the present invention is applied in order to implement monitoring for abnormality or the like in power plants, buildings, factories (each site), etc. The first wireless station (gateway wireless communication instrument) receives data (e.g. data sensed by sensors installed in each site) from second and third wireless stations (a plurality of wireless communication instruments and monitors whether or not there is an abnormality in each site based on the data.

According to the present invention, it is possible to provide a low-delay wireless communication, while changing settings for communication by tracking and responding to a change in the communication environment. In addition, even if a communication implementing method in which a same timeslot is shared by a plurality of wireless stations for more efficient communication is used, a low-delay communication can be achieved. As a result, in compliance with a high reliability requirement required for industrial applications, reducing installation cost, shortening work periods, and building a flexible system are feasible.

(ii) In the first embodiment, a period between successive timings of data acquisition is regarded as one cycle and a process of communication data acquisition, a process of measuring communication quality, a process of communication quality data acquisition, and a process of channel change are each executed within one cycle (see FIG. 9). However, the process of communication quality data acquisition and the process of channel change may be executed every predefined number of cycles, not every cycle. A time limit T is set for each process and processing is to proceed to the next process (for example, from the process of communication data acquisition to the process of measuring communication quality) upon the expiry of the time limit T. The time limit of each process may be set to an equal period or a different period. In this way, by setting a period or time limit to execute each communication process (may also be referred as sequence) so that processing will proceed to the next sequence even if the preceding sequence is not completed within the time limit, it is avoided that a delay of one sequence causes a delay of other sequences, particularly, the sequence of communication data acquisition and stable communication at constant intervals can be performed.

When the time limit T has come, a process being executed is interrupted and processing proceeds to the next process. In a case where, because of the interruption, an unfinished process remains in a plurality of wireless stations (for example, communication quality data (e.g., interference occurrence rate) is not yet acquired from all wireless stations), in the next cycle starting at the next timing of data acquisition, the unfinished process will be continued from the interruption point in the preceding cycle. By doing in this way, sufficient statistical data can be accumulated, while each process continues to be executed in a plurality of cycles, without concentrating data acquisition on a certain type of data to be acquired. That is, if it takes a certain amount of time only for the process of communication data acquisition, it may happen that communication quality data cannot be acquired sufficiently. In that event, even if the communication condition of a channel in use is not good, changing to another channel cannot be performed, which results in a delay in communication processing. According to the present invention, processes required for channel change can be executed in a balanced manner and such a communication time delay due to concentration on the execution of a particular process can be avoided.

(iii) In the second embodiment, the process of channel change is adapted to execute changing channels in such a way as to change hopping frequencies in a stepwise fashion by comparing acquired communication quality data against a plurality of stepwise threshold values which have been set. By doing in this way, channels can be changed in turn from channels in bad communication condition and a risk of discontinued communication can be prevented, as compared with the case of changing all bad quality channels worse than a relatively low threshold value. Because there is no need for executing recovery processing from channel change, load on the system can be alleviated.

(iv) In the third embodiment, timeslots specifically for quality measurement are provided in a superframe describing a hopping pattern, thus controlling the process of measuring quality. That is, in the timeslots specifically for quality measurement, it is allowed to measure the quality of all channels not only the channels specified in a hopping pattern. As a result, when a channel once judged as a bad quality channel has become a good quality channel later, it becomes possible to reuse the channel immediately.

(v) In the fourth embodiment, communication sections are formed between a first wireless station and a second wireless station and between the second wireless station and a third wireless station (further, between wireless station k and wireless station k+1) (see FIG. 23). Also, all channels are grouped into several groups (see FIG. 24). It is arranged not to use channels from a same group consecutively and not to use more than one channel from a same group in a same timeslot. That is, order of a plurality of channel groups to be used in each communication section is predetermined and the process of channel change in each communication section is executed by selecting one of channels defined in each group. By doing in this way, it is possible to avoid interference in response to the environment of a place where wireless station k is installed (such as the presence of a wireless LAN near the wireless station). Also, more efficient communication in each wireless section becomes feasible.

(vi) In the fifth embodiment, a send timeslot that is sent from the first wireless station to each second wireless station includes a carrier sense period and an offset period defining a period from the beginning of the timeslot to the start of the carrier sense period. In a case in which the first wireless station communicates with at least two wireless stations using a same channel, the offset periods differing in length are provided in the timeslots for these two stations. Specifically, the offset period is set shorter for a wireless station, one of the at least two wireless stations, which is put later in the order of data acquisition. By doing in this way, a packet sent earlier for a wireless station can be detected by carrier sense, so that packet contention will not occur. That is, if there is fear of collision of packets for data sending to at least two wireless stations (10A and 10B), even if ACK from the first wireless station to a wireless station (10A) which is put earlier in the order of data acquisition failed to be received by the wireless station, the first wireless station receives data from a wireless station (10B) which is put later in the order of data acquisition. It thus becomes possible to avoid the collision of packets for at least two wireless stations sharing a channel.

(vii) In the sixth embodiment, in a case in which the first wireless station communicates with at least two wireless stations (10A and 10B) using a same channel, priority of sending is set for packets to send stored in the send queue. More specifically, the priority of sending is set high for a packet to be sent to a wireless station, one of the at least two wireless stations, which is put later in the order of data acquisition. That is, if both packets to be sent respectively to the at least two wireless stations exist in the send queue, sending of a packet to a wireless station (10B) put later in the order of data acquisition is processed preferentially. By doing in this way, duplicated communication and packets remaining queued can be avoided and, therefore, more efficient communication and communication processing without a delay can be achieved.

(viii) The present invention can be implemented by software program code that implements the functions of the embodiments. In this case, a storage medium having the program code recorded thereon is provided to the system or instruments and the computer (or CPU or MPU) of the system or instruments reads the program code stored on the storage medium. In this case, the program code itself read from the storage medium implements the functions of the previously described embodiments and the program code itself and the storage medium on which it was stored embody the present invention. As the storage medium for supplying such program code, for example, any of the following is used: a flexible disk, CD-ROM, DVD-ROM, hard disk, optical disk, magnetic optical disk, CD-R, magnetic tape, nonvolatile memory card, ROM, etc.

Alternatively, OS (operating system) or the like running on the computer may execute a part or the whole of actual processes according to instructions of program code and the functions of the previously described embodiments may be implemented by such processes. Moreover, after program code read from the storage medium is written into a memory on the computer, the CPU or the like of the computer may execute a part or the whole of actual processes according to instructions of the program code and the functions of the previously described embodiments may be implemented by such processes.

Moreover, software program code that implements the functions of the embodiments may be distributed via a network and stored into a storage means such as a hard disk or memory of the system or instruments or a storage medium such as a CD-RW or CD-R. In use, the computer (or CPU or MPU) of the system or instruments may read and execute the program code from the storage means or storage medium.

Finally, it needs to be understood that the processes and techniques described herein are not essentially related to any specific equipment, device, or instrument and can be implemented by any suitable combination of components. Moreover, a variety of types of devices intended for general use can be used according to the teaching described herein. In order to execute the steps of the methods described herein, building a specialized device may be appreciated to be beneficial. Also, diverse inventions can be formed by an appropriate combination of a plurality of components disclosed in the embodiments. For example, some components may be removed from among all components presented in the embodiments. Besides, components across different embodiments may be combined appropriately. Although the present invention has been described in connection with concrete examples, these examples are provided for illustrative purpose, but not limiting purpose in all respects. A person skilled in the art of this field may appreciate that there are many combinations of hardware, software, and firmware suitable for carrying out the present invention. For example, the described software can be implemented by a wide variety of programs or script languages such as assembler, C/C++, perl, Shell, PHP, and Java (a registered trademark).

Besides, control lines and information lines considered as necessary for explanatory purposes are shown with regard to the foregoing embodiments. For products, all the control lines and information lines are not necessarily shown. All components may be interconnected.

In addition, other implementations of the present invention may be apparent to a person having ordinary knowledge in the art of this field from consideration of the specification and embodiments of the present invention disclosed herein. Various aspects of the described embodiments and/or their components can be used solely or in any combination in a computerized storage system having a data management function. The specification and concrete examples are only typical and the scope and spirit of the present invention are set forth in the claims that follow.

What is claimed is:

1. A gateway wireless communication instrument for controlling communication of a plurality of wireless communication instruments in a wireless communication system, the gateway wireless communication instrument comprising:
a memory configured to store information on hopping frequencies for execution of communication with the wireless communication instruments and communication between the wireless communication instruments; and
a processor configured to execute Time Division Multiple Access and channel hopping according to a predetermined pattern stored in the memory and to control communication,
wherein the processor regards a period between successive timings of data acquisition as one cycle and, in each cycle, is configured to execute (i) a process of communication data acquisition for acquiring communication data from the wireless communication instruments, (ii) a process or measuring communication quality for measuring communication quality on the wireless communication instruments, (iii) a process of communication quality data acquisition for acquiring respective communication quality data measured at the wireless communication instruments, and (iv) a process of channel change that comprises judging good quality channels based on the communication quality data acquired by the process of communication quality data acquisition and changing the hopping frequencies based on the judging good quality channels,
wherein the processor is configured to execute each of the processes, while changing from one process to another in order, based on a time limit set for each of the process of communication data acquisition, the process of measuring communication quality, the process of communication quality data acquisition, and the process of channel change,
when the time limit for executing the process of communication data acquisition has elapsed and the process of communication data acquisition is not finished completely, or when the time limit for executing the process of communication quality data acquisition has elapsed and the process of communication data acquisition is not finished completely, the processor is configured to execute a next process, and
communication data (sensor data) and communication quality data (interference occurrence rate) not yet acquired in a current cycle are acquired in a next cycle.

2. The gateway wireless communication instrument according to claim 1, wherein, when a time limit has elapsed, the processor is configured to interrupt a process being executed and proceed to a next process and when, because of the interruption, an unfinished process remains in the wireless communication stations, the processor is configured to continue the unfinished process in a next cycle.

3. The gateway wireless communication instrument according to claim 1,
wherein, in the process of channel change, the processor is configured to execute changing channels to change the hopping frequencies in a stepwise fashion by comparing the acquired communication quality data against a plurality of stepwise threshold values which have been set.

4. A gateway wireless communication instrument for controlling communication of a plurality of wireless communication instruments in a wireless communication system, the gateway wireless communication instrument comprising:
a memory configured to store information on hopping frequencies for execution of communication with the wireless communication instruments and communication between the wireless communication instruments; and
a processor configured to execute Time Division Multiple Access and channel hopping according to a predetermined pattern stored in the memory and to control communication,
wherein the processor regards a period between successive timings of data acquisition as one cycle and, in each cycle, is configured to execute (i) a process of communication data acquisition for acquiring communication data from the wireless communication instruments, (ii) a process of measuring communication quality for measuring communication quality on the wireless communication instruments, (iii) a process of communication quality data acquisition for acquiring respective communication quality data measured at the wireless communication instruments, and (iv) a process of channel change that comprises judging good quality channels based on the communication quality data acquired by the process of communication quality data acquisition and changing the hopping frequencies based on the judging good quality channels
wherein the processor is configured to request the wireless communication instruments to measure an interference occurrence rate in the process of measuring communication quality, to receive the interference occurrence rates measured at the wireless communication instruments in response to the request from the wireless communication instruments in the process of communication quality data acquisition, and to judge whether or not to change the hopping frequencies of the wireless communication instruments based on the received interference occurrence rates in the process of channel change,
when a time limit for executing the process of communication data acquisition has elapsed and the process of communication data acquisition is not finished completely, or when a time limit for executing the process of communication quality data acquisition has elapsed and the process of communication data acquisition is not finished completely, the processor is configured to execute a next process, and
communication data (sensor data) and communication quality data (interference occurrence rate) not yet acquired in a current cycle are acquired in a next cycle.

5. A gateway wireless communication instrument for controlling communication of a plurality of wireless communication instruments in a wireless communication system, the gateway wireless communication instrument comprising:
a memory configured to store information on hopping frequencies for execution of communication with the wireless communication instruments and communication between the wireless communication instruments; and
a processor configured to execute Time Division Multiple Access and channel hopping according to a predetermined pattern stored in the memory and to control communication,
wherein the processor regards a period between successive timings of data acquisition as one cycle and, in each cycle, is configured to execute (i) a process of communication data acquisition for acquiring communication data from the wireless communication instruments, (ii) a process of measuring communication quality for measuring communication quality on the wireless communication instruments, (iii) a process of communication quality data acquisition for acquiring respective communication quality data measured at the wireless communication instruments, and (iv) a process of channel change that comprises judging good quality channels based on the communication quality data acquired by the process of communication quality data acquisition and changing the hopping frequencies based on the judging good quality channels
wherein communication sections between the gateway wireless communication instrument and the plurality of wireless communication instruments and communication sections between the wireless communication instruments are formed,
wherein the memory stores, as the information on the hopping frequencies, information on a plurality of channel groups determined by combinations of the hopping frequencies, and
wherein the processor is configured to determine order of the channel groups to be used in the communication sections and to execute the process of channel change in the communication sections by selecting one of channels defined in each group,
when a time limit for executing the process of communication data acquisition has elapsed and the process of communication data acquisition is not finished completely, or when a time limit for executing the process of communication quality data acquisition has elapsed and the process of communication data acquisition is not finished completely, the processor is configured to execute a next process, and
communication data (sensor data) and communication quality data (interference occurrence rate) not yet acquired in a current cycle are acquired in a next cycle.

6. A gateway wireless communication instrument for controlling communication of a plurality of wireless communication instruments in a wireless communication system, the gateway wireless communication instrument comprising:
a memory configured to store information on hopping frequencies for execution of communication with the wireless communication instruments and communication between the wireless communication instruments; and
a processor configured to execute Time Division Multiple Access and channel hopping according to a predetermined pattern stored in the memory and to control communication,
wherein the processor regards a period between successive timings of data acquisition as one cycle and, in each cycle, is configured to execute (i) a process of communication data acquisition for acquiring communication data from the wireless communication instruments, (ii) a process of measuring communication quality for measuring communication quality on the wireless communication instruments, (iii) a process of communication quality data acquisition for acquiring respective communication quality data measured at the wireless communication instruments, and (iv) a process of channel change that comprises judging good quality channels based on the communication quality data acquired by the process of communication quality data acquisition and changing the hopping frequencies based on the judging good quality channels wherein the memory stores information on a destination wireless communication instrument which is information on a final destination of communication and information on a forwarding destination wireless communication instrument which is information on a forwarding destination node to relay communication with the destination wireless communication instrument, and wherein the processor is configured to send a request that is required in each of the process of communication data acquisition, the process of measuring communication quality, the process of communication quality data acquisition, and the process of channel change to the destination wireless communication instrument and to acquire acknowledgment (ACK) data from the destination wireless communication instrument via the forwarding destination wireless communication instrument, when a time limit for executing the process of communication data acquisition has elapsed and the process of communication data acquisition is not finished completely, or when a time limit for executing the process of communication quality data acquisition has elapsed and the process of communication data acquisition is not finished completely, the processor is configured to execute a next process, and communication data (sensor data) and communication quality data (interference occurrence rate) not yet acquired in a current cycle are acquired in a next cycle.

7. A wireless communication system comprising a gateway wireless communication instrument and a plurality of wireless communication instruments, the gateway wireless communication instrument configured to execute Time Division Multiple Access and channel hopping according to a predetermined pattern stored in a memory of the gateway wireless communication instrument and to control communication processing between the gateway wireless communication instrument and the wireless communication instruments, the communication processing comprising:

a process of communication data acquisition in which the gateway wireless communication instrument sends a data send request to the wireless communication instruments and the wireless communication instruments receive the data send request, acknowledge it, and send communication data to the gateway wireless communication instrument;

a process of measuring communication quality in which the gateway wireless communication instrument sends a request for measuring communication quality to the wireless communication instruments and the wireless communication instruments receive the request for measuring communication quality, acknowledge it, and measure communication quality by performing carrier sense;

a process of communication quality data acquisition in which the gateway wireless communication instrument sends a communication quality data send request to the wireless communication instruments and the wireless communication instruments receive the communication quality data send request, acknowledge it, and send communication quality data obtained by measuring the communication quality to the gateway wireless communication instrument; and a process of channel change in which the gateway wireless communication instrument judges whether or not to change communication channels of the wireless communication instruments based on the communication quality data acquired by the process of communication quality data acquisition and changes the hopping frequencies based on the judging good quality channels and sends a request for changing channels to a wireless communication instrument using channels that should be changed and the corresponding wireless communication instrument receives the request for changing channels, acknowledges it, and changes channels used for communication, wherein the gateway wireless communication instrument is configured to control each of the processes, while changing from one process to another in order, based on a time limit set for each of the process of communication data acquisition, the process of measuring communication quality, the process of communication quality data acquisition, and the process of channel change, when a time limit for executing the process of communication data acquisition has elapsed and the process of communication data acquisition is not finished completely, or when a time limit for executing the process of communication quality data acquisition has elapsed and the process of communication data acquisition is not finished completely, the gateway wireless communication instrument is configured to execute a next process, and communication data (sensor data) and communication quality data (interference occurrence rate) not yet acquired in a current cycle are acquired in a next cycle.

8. A communication control method in a wireless communication system comprising a gateway wireless communication instrument configured to execute Time Division Multiple Access and channel hopping according to a predetermined pattern stored in a memory of the gateway wireless communication instrument and a plurality of wireless communication instruments, the communication control method comprising:

a process of communication data acquisition for acquiring communication data from the wireless communication instruments, in which the gateway wireless communication instrument sends a data send request to the wireless communication instruments and the wireless communication instruments receive the data send request, acknowledge it, and send communication data to the gateway wireless communication instrument;

a process of measuring communication quality for measuring communication quality on the wireless communication instruments, in which the gateway wireless communication instrument sends a request for measuring communication quality to the wireless communication instruments and the wireless communication instruments receive the request for measuring communication quality, acknowledge it, and measure communication quality by performing carrier sense;

a process of communication quality data acquisition for acquiring respective communication quality data measured at the wireless communication instruments, in which the gateway wireless communication instrument sends a communication quality data send request to the wireless communication instruments and the wireless communication instruments receive the communication quality data send request, acknowledge it, and send communication quality data obtained by measuring the communication quality to the gateway wireless communication instrument; and a process of channel change that changes hopping frequencies based on the communication quality data acquired by the process of communication quality data acquisition, in which the gateway wireless communication instrument judges whether or not to change communication channels of the wireless communication instruments based on the communication quality data acquired by the process of communication quality data acquisition and changes the hopping frequencies based on the judging good quality channels and sends a request for changing channels to a wireless communication instrument using channels that should be changed and the corresponding wireless communication instrument receives the request for changing channels, acknowledges it, and changes channels used for communication, wherein the gateway wireless communication instrument is configured to control each of the processes, while changing from one process to another in order, based on a time limit set for each of the process of communication data acquisition, the process of measuring communication quality, the process of communication quality data acquisition, and the process of channel change, when a time limit for executing the process of communication data acquisition has elapsed and the process of communication data acquisition is not finished completely, or when a time limit for executing the process of communication quality data acquisition has elapsed and the process of communication data acquisition is not finished completely, the gateway wireless communication instrument is configured to execute a next process, and communication data (sensor data) and communication quality data (interference occurrence rate) not yet acquired in a current cycle are acquired in a next cycle.

* * * * *